May 8, 1962  F. M. CARROLL ETAL  3,033,564
ARTICLE STACKING APPARATUS
Original Filed Sept. 19, 1957  24 Sheets-Sheet 1
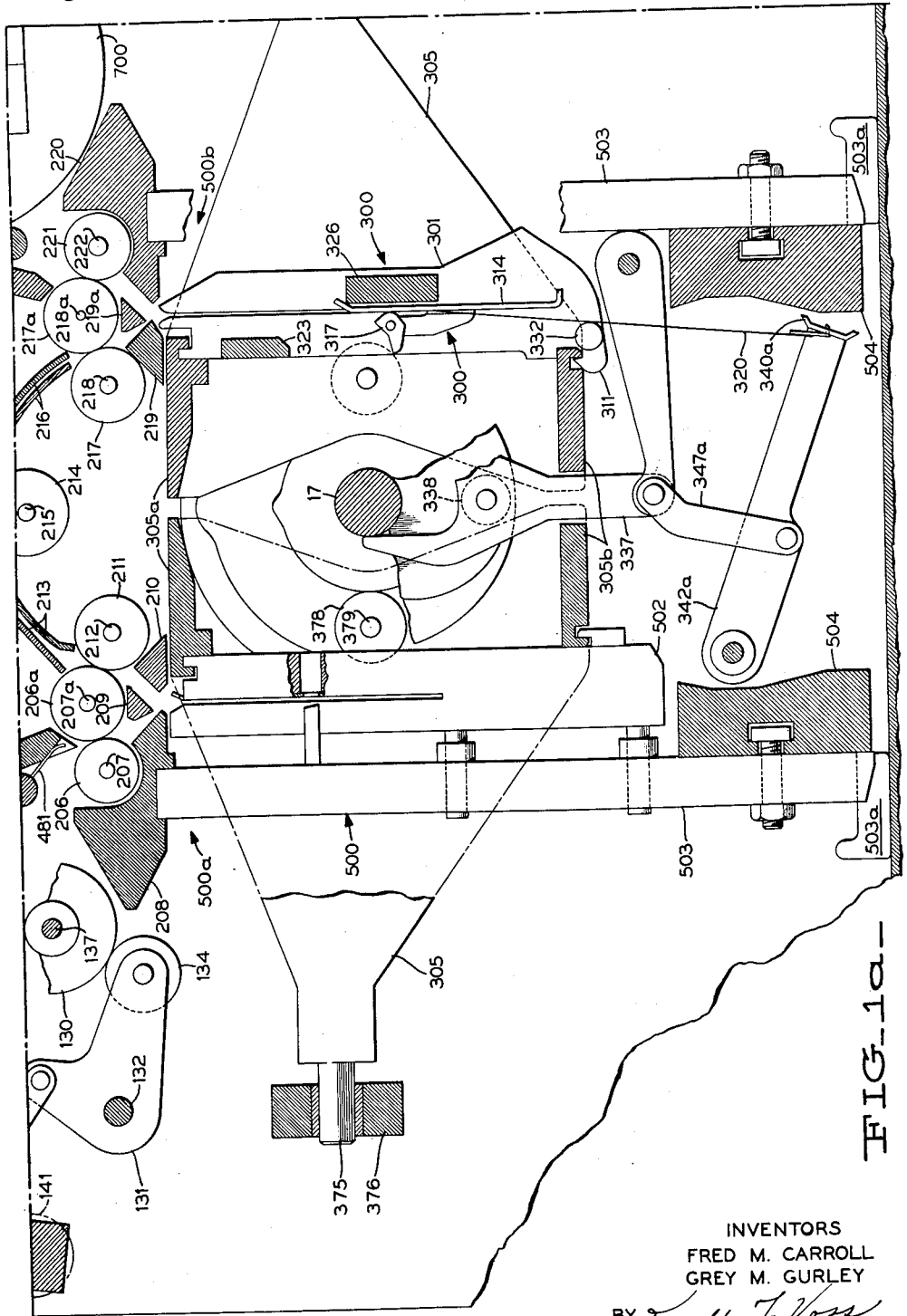
FIG_1a_
INVENTORS
FRED M. CARROLL
GREY M. GURLEY
BY Donald F Voss
ATTORNEY

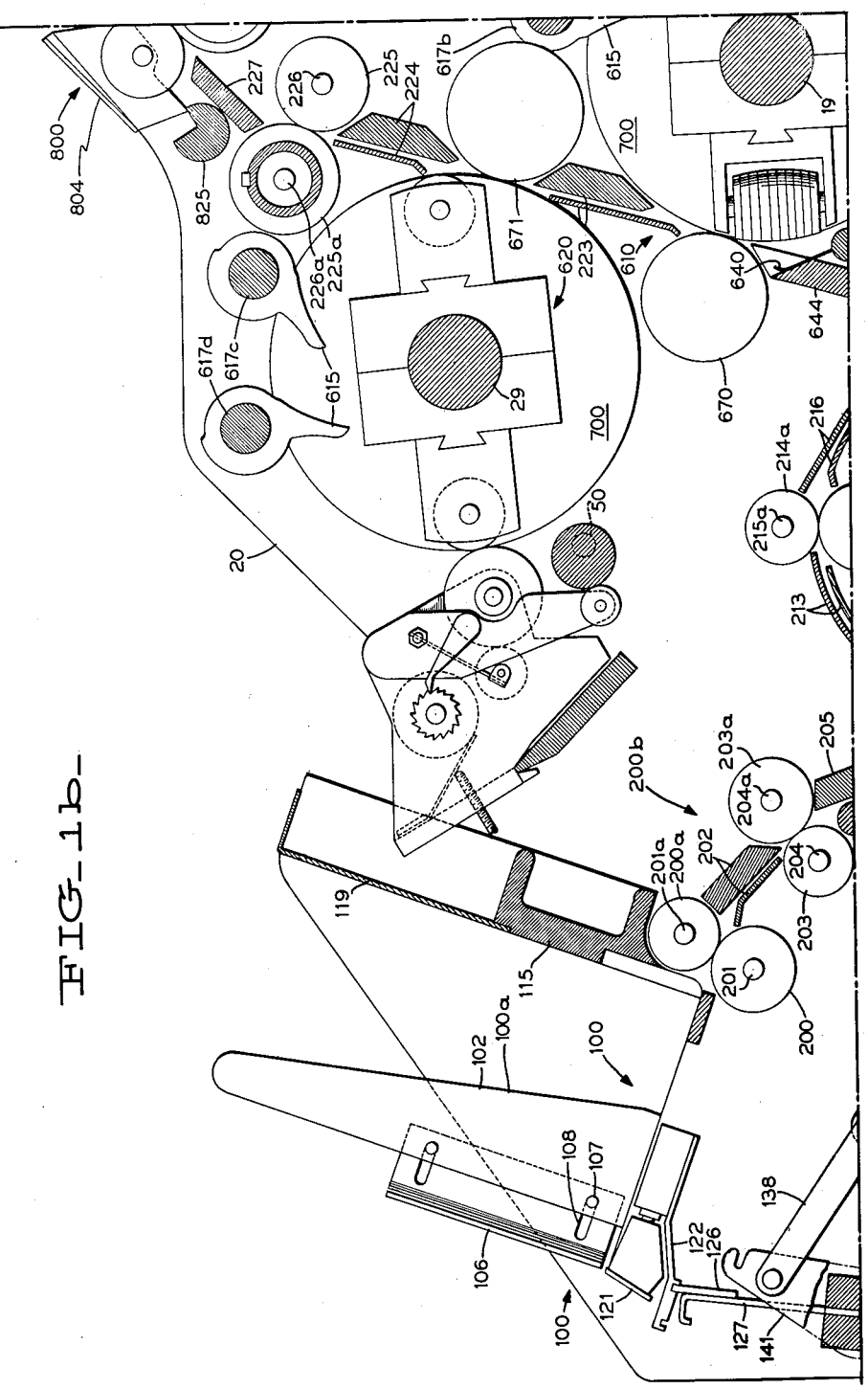

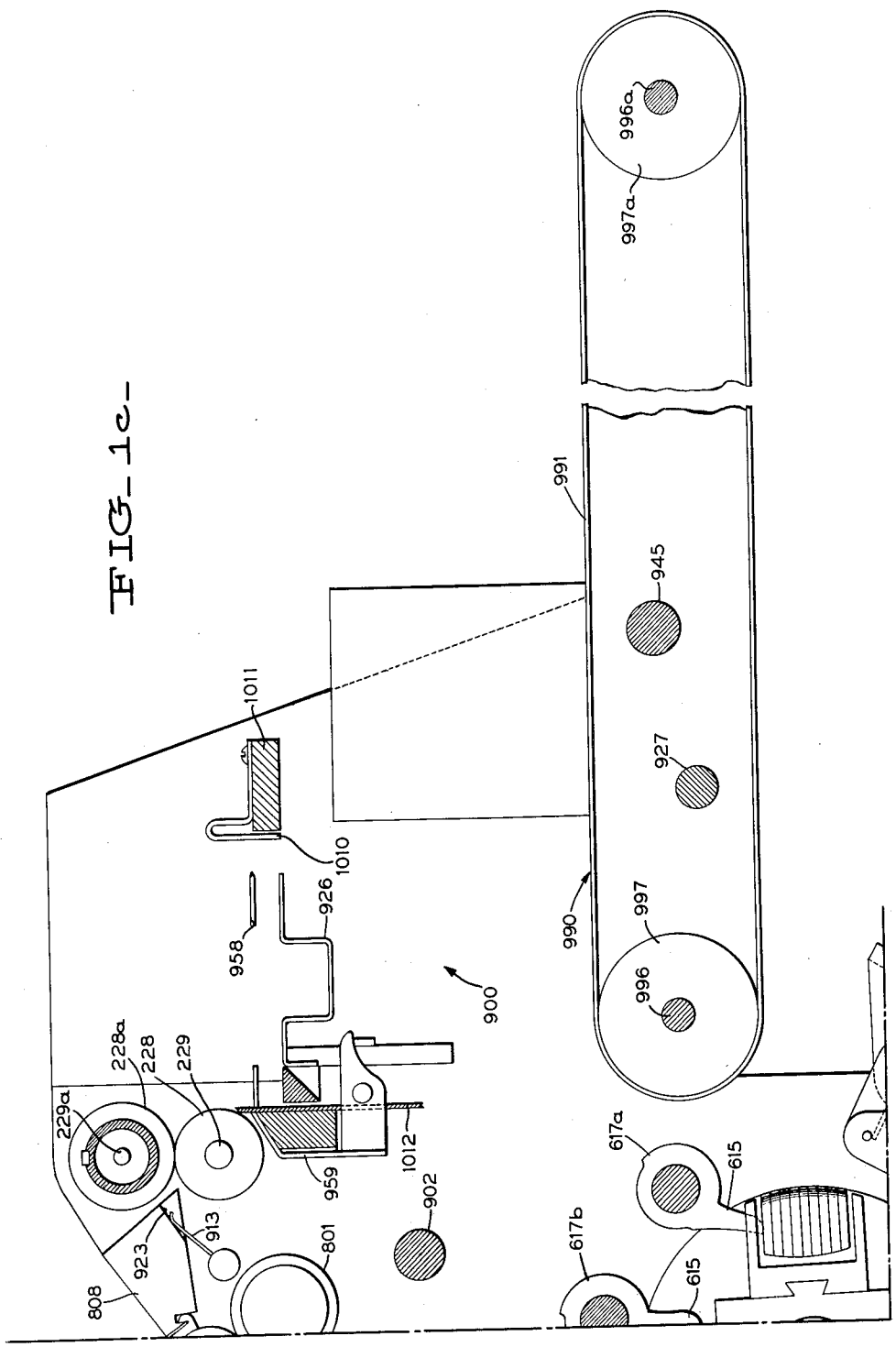

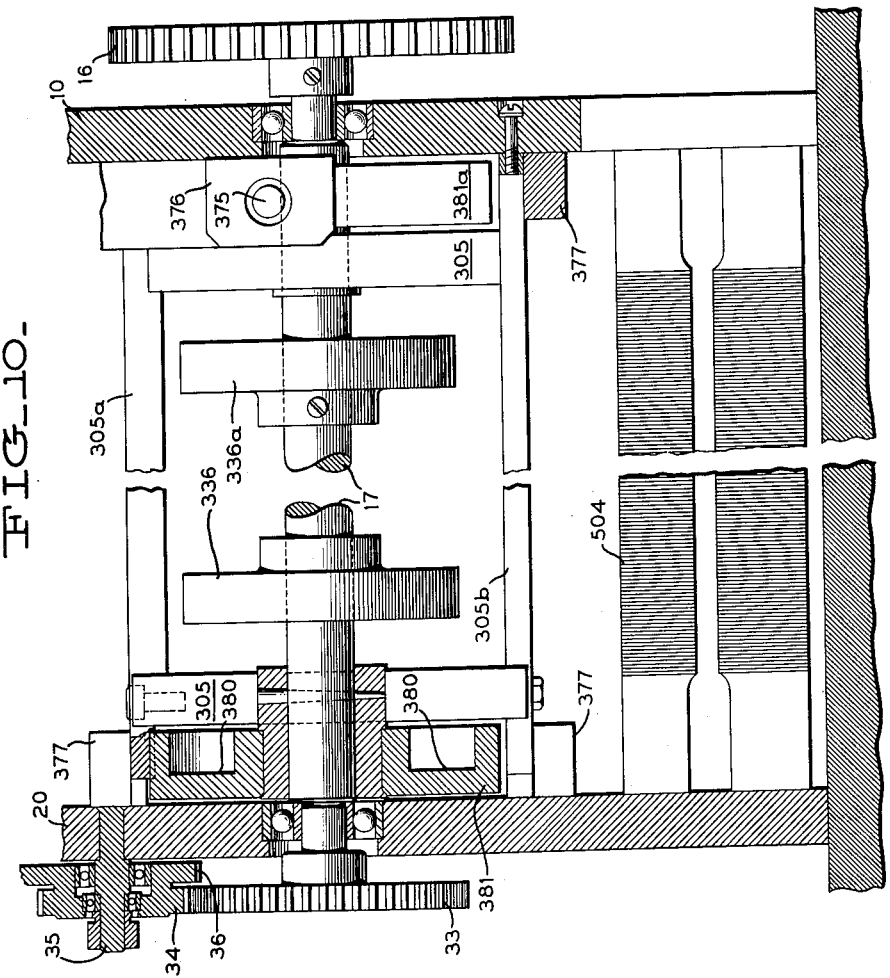
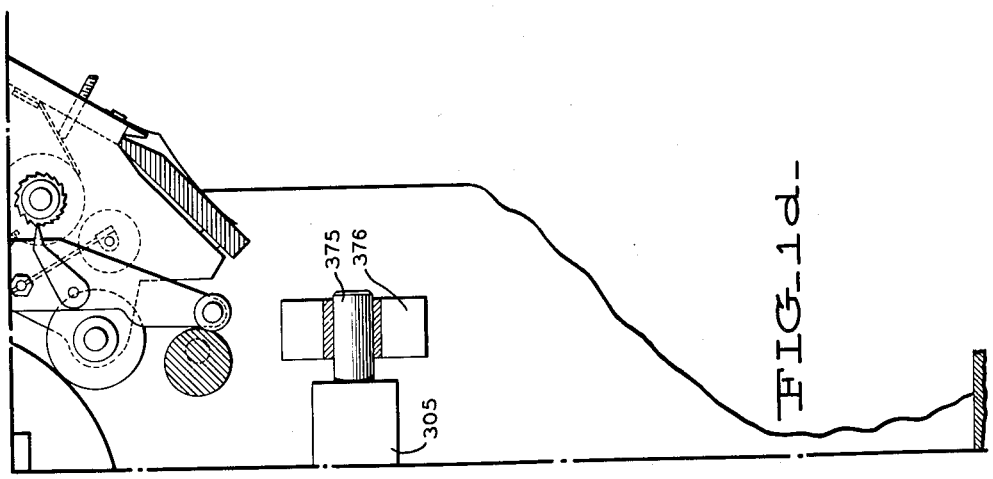

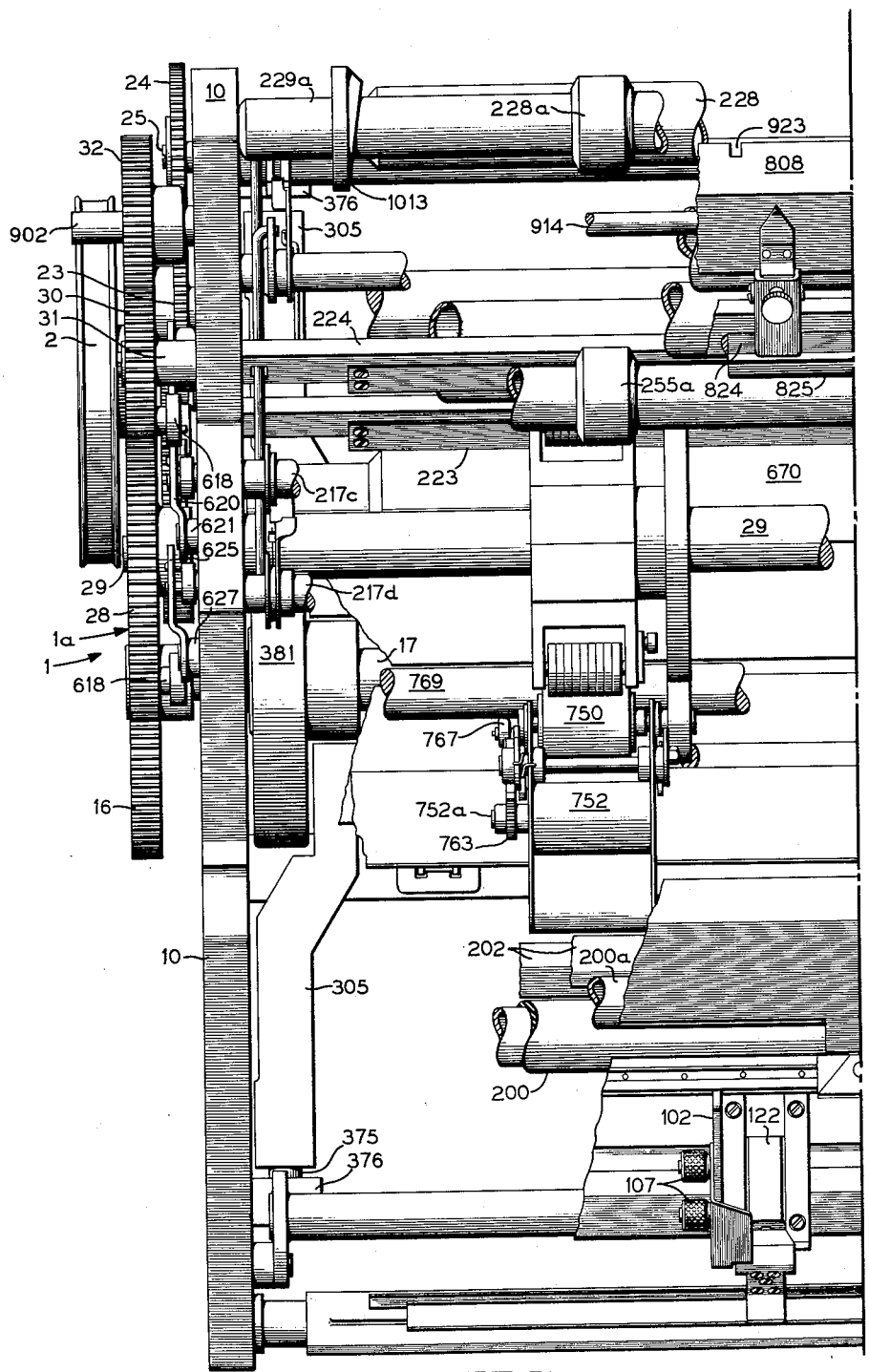
FIG_2a_

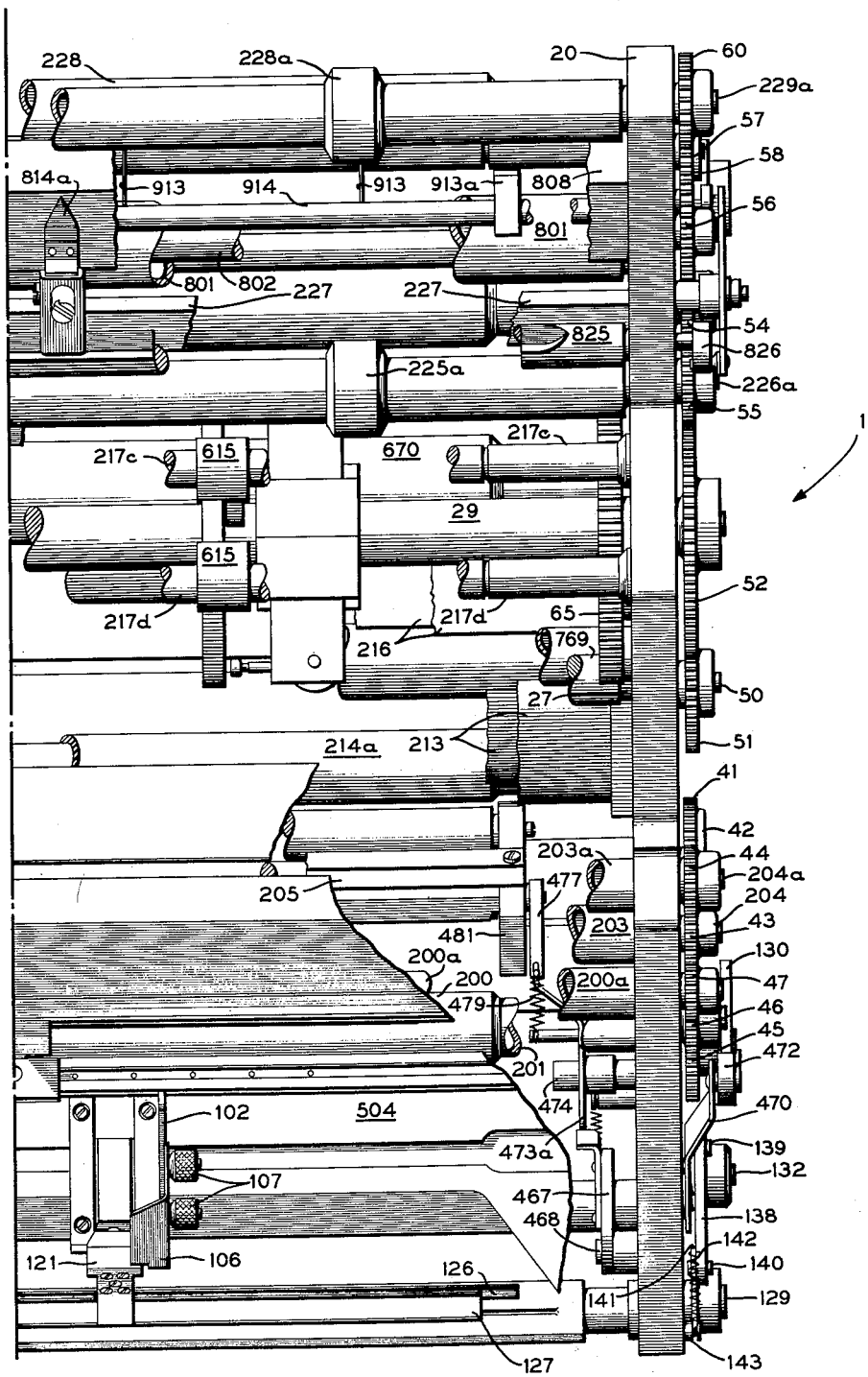
FIG_2b_

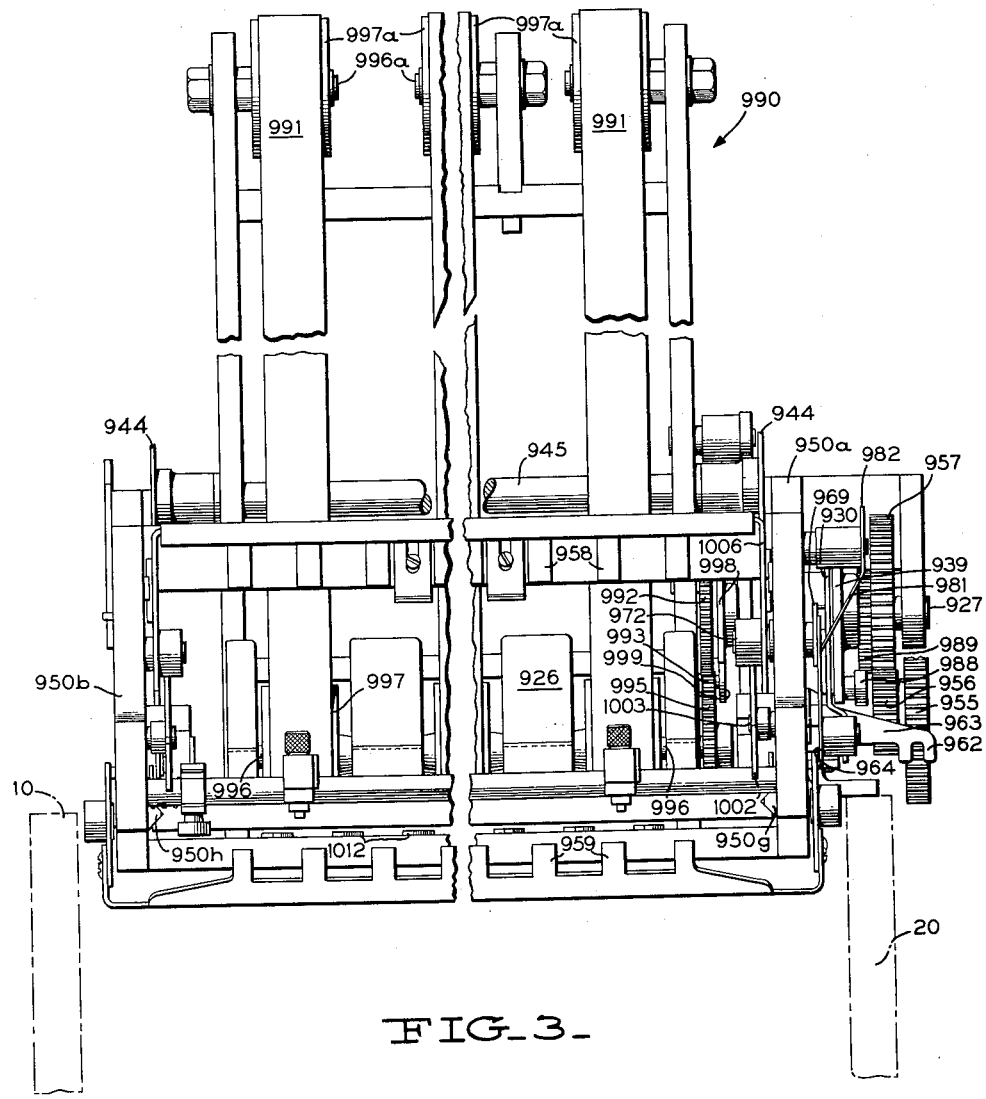
FIG_3_

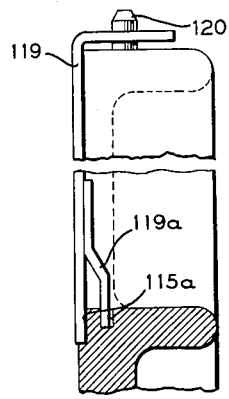
FIG_6a_
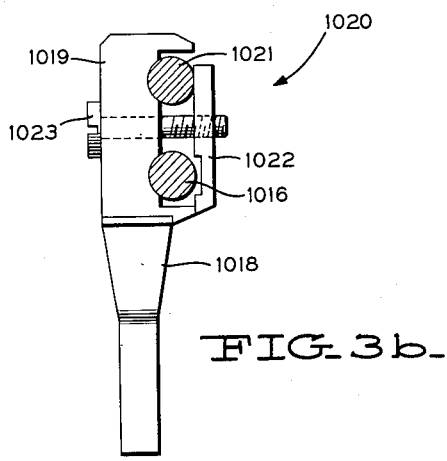
FIG_3b_
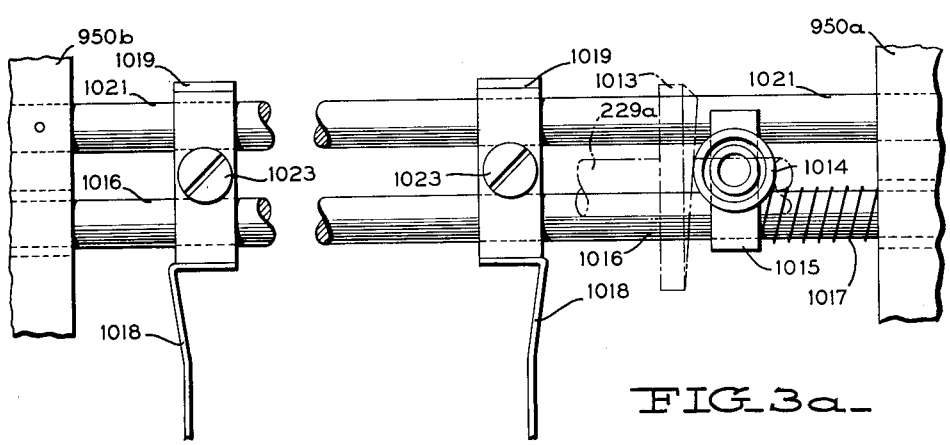
FIG_3a_

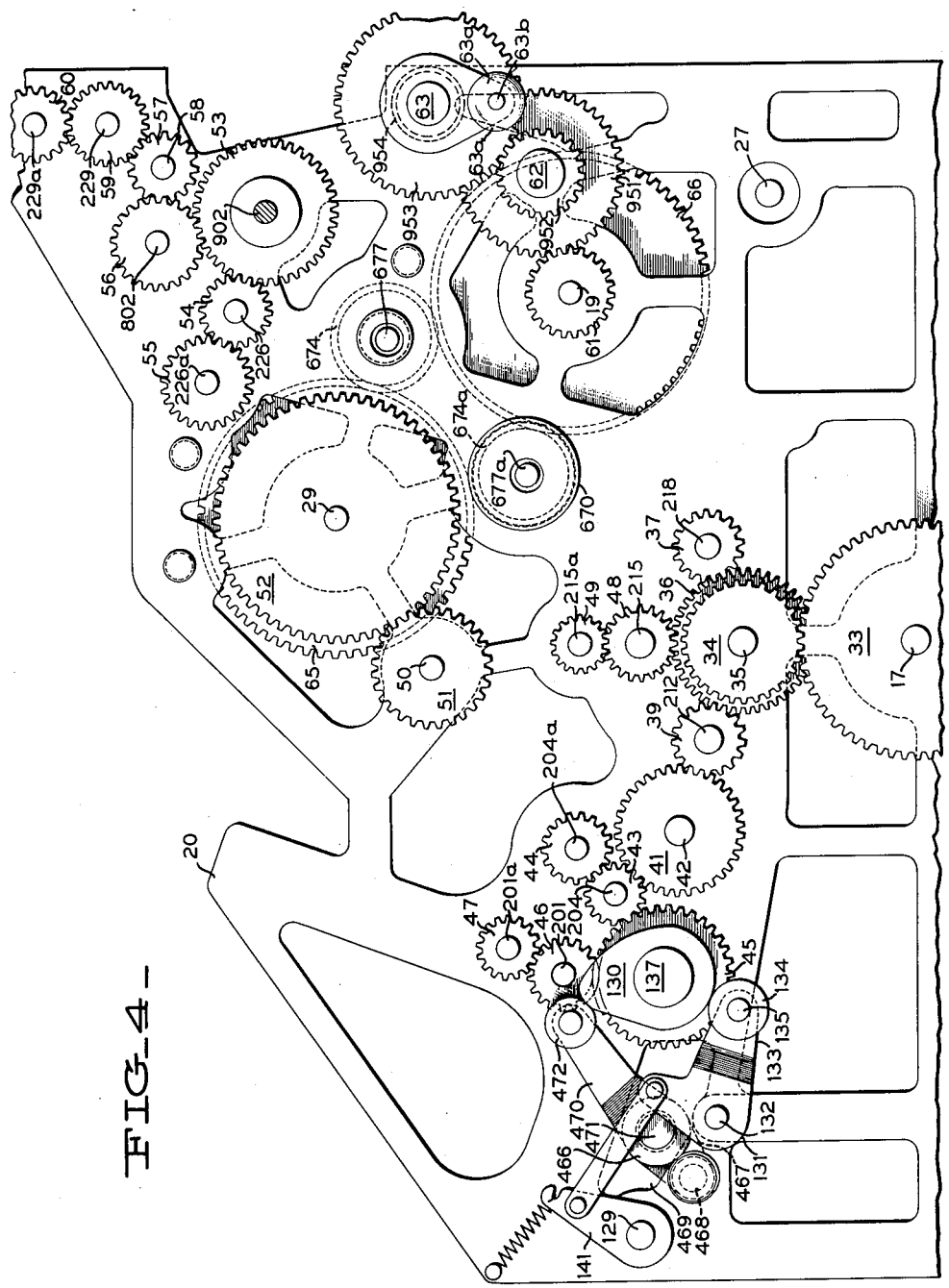
FIG_4_

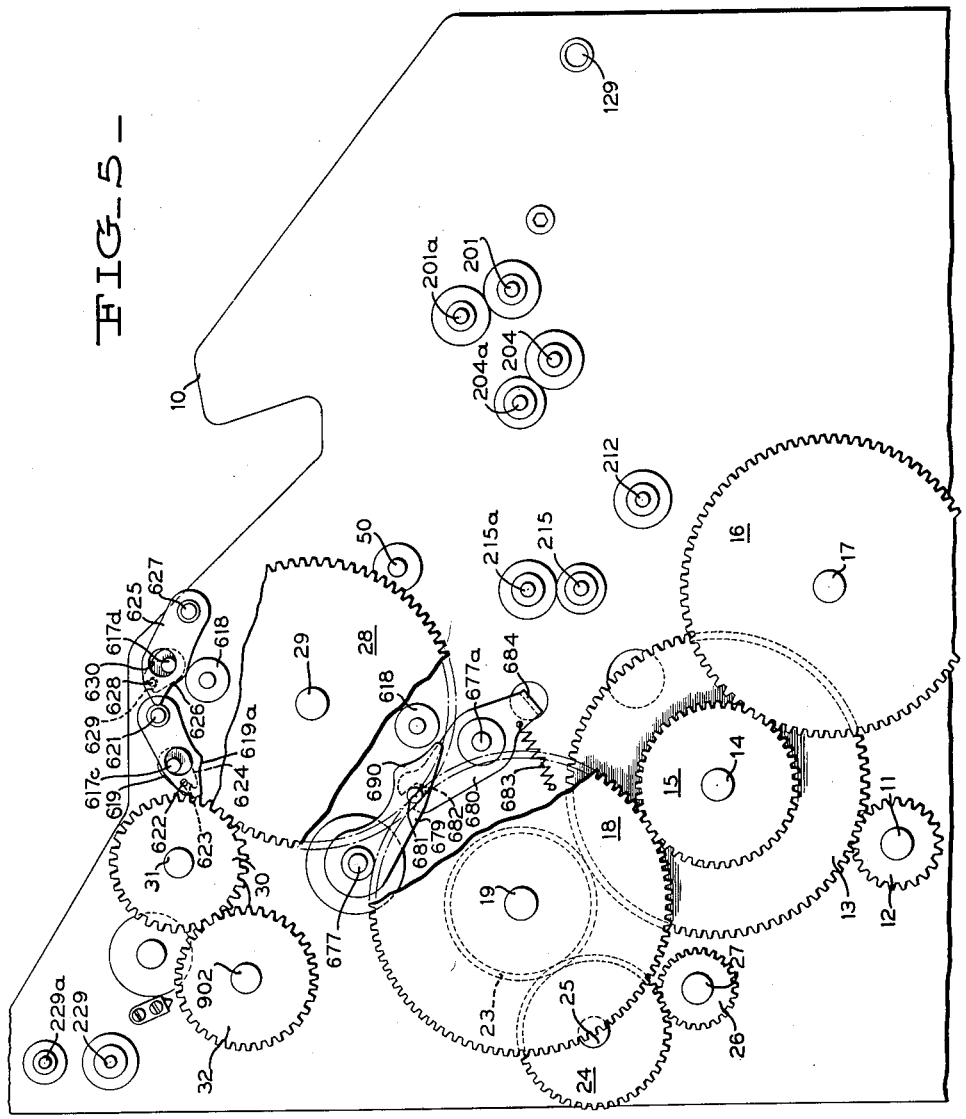
FIG_5

May 8, 1962 F. M. CARROLL ETAL 3,033,564
ARTICLE STACKING APPARATUS
Original Filed Sept. 19, 1957 24 Sheets-Sheet 11
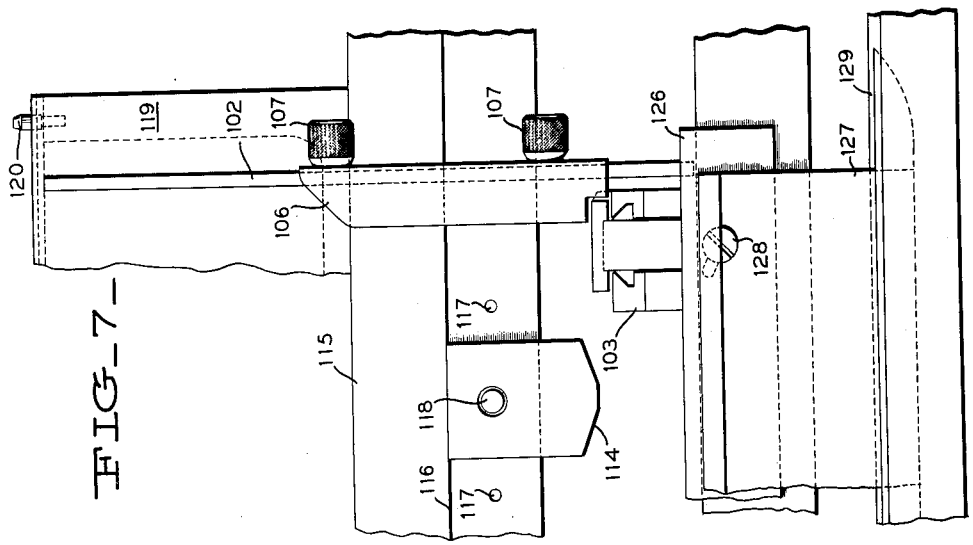
FIG-7-
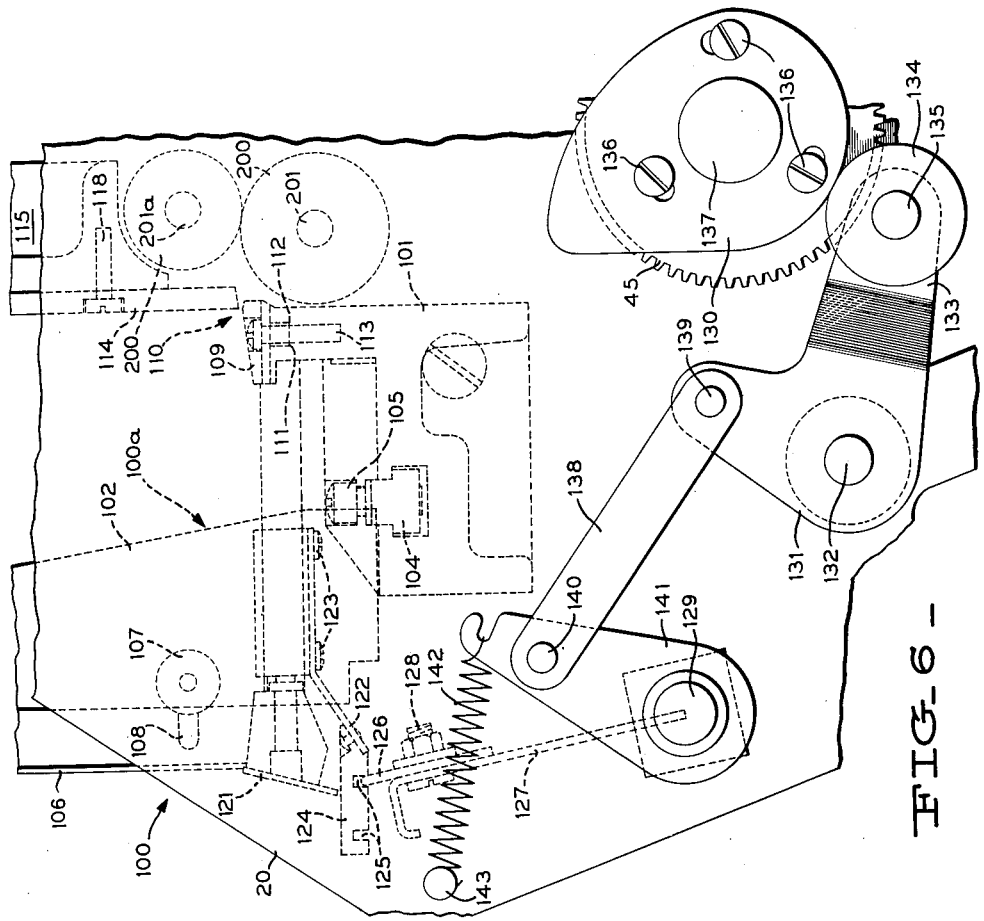
FIG-6-

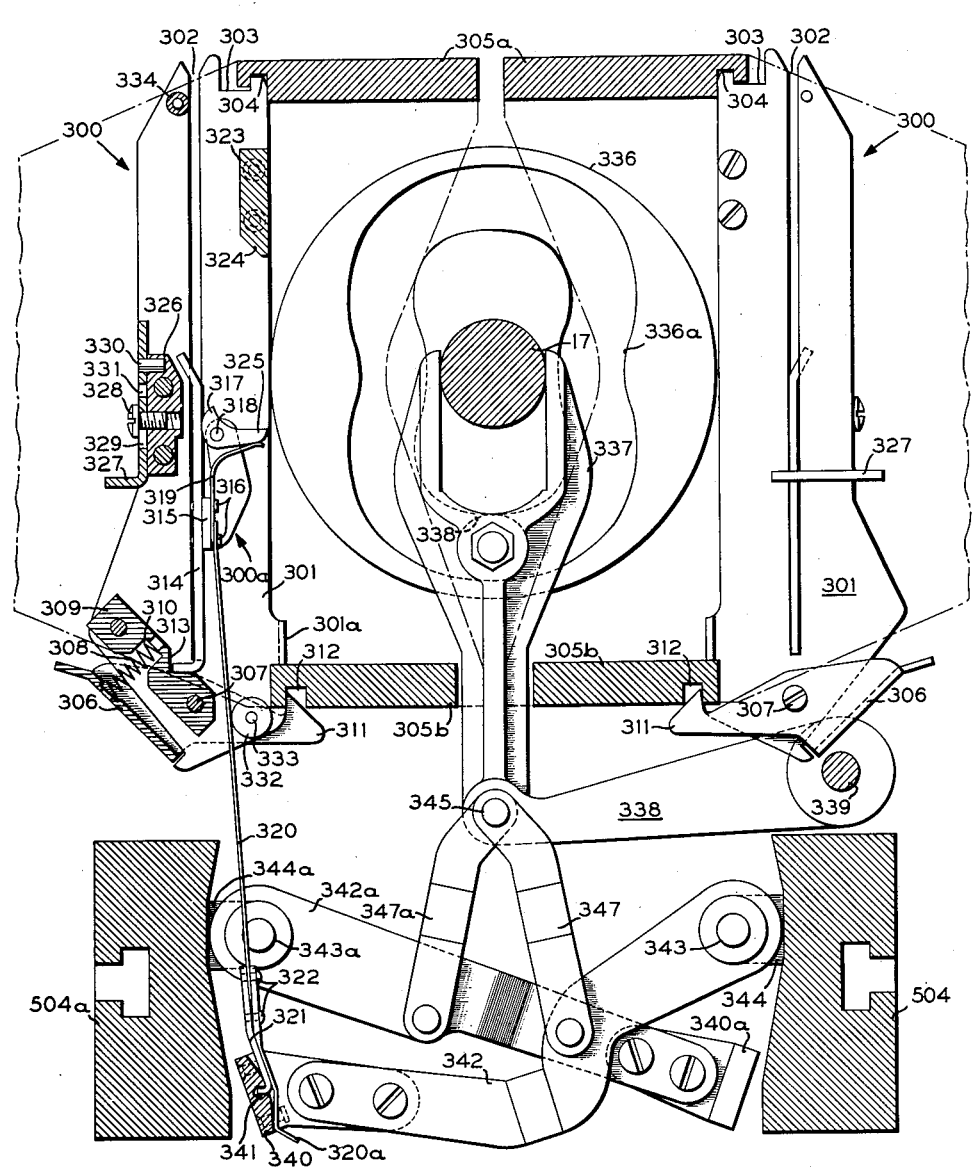
FIG_8_

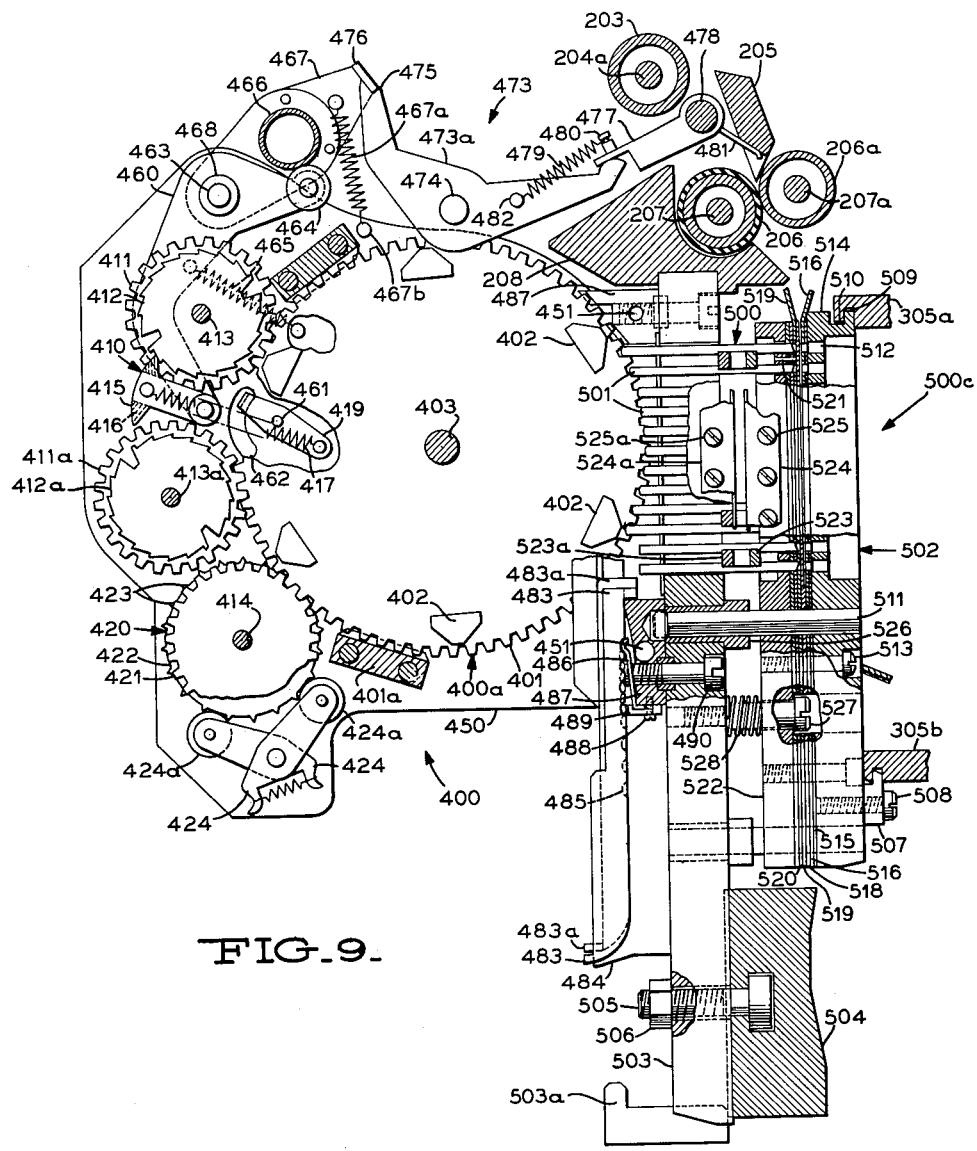
FIG-9-

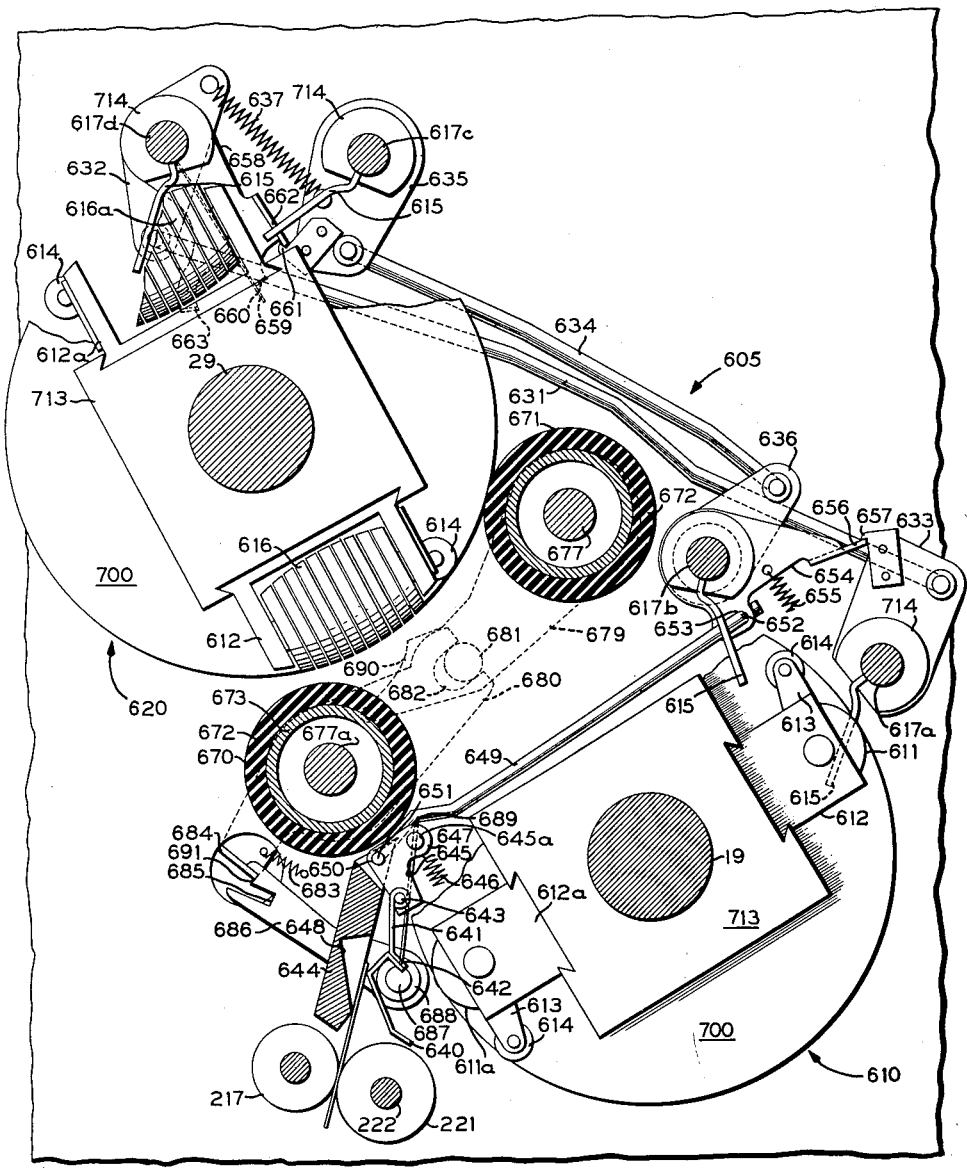
FIG_11_

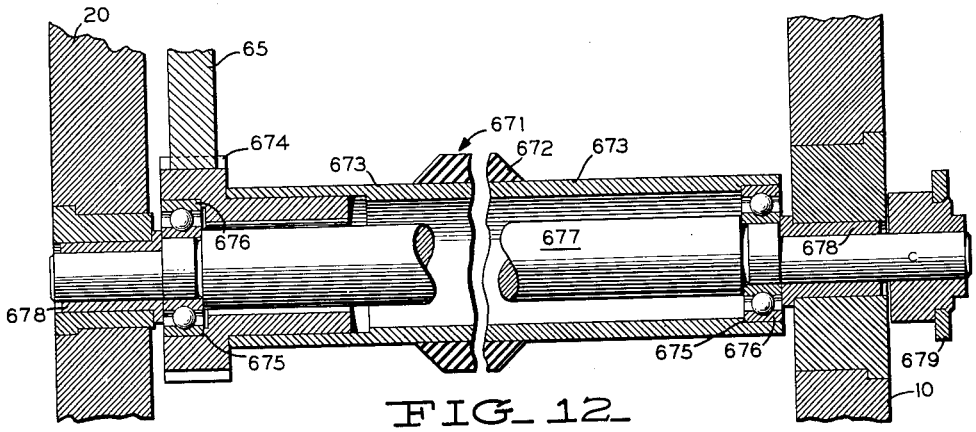
FIG_12_
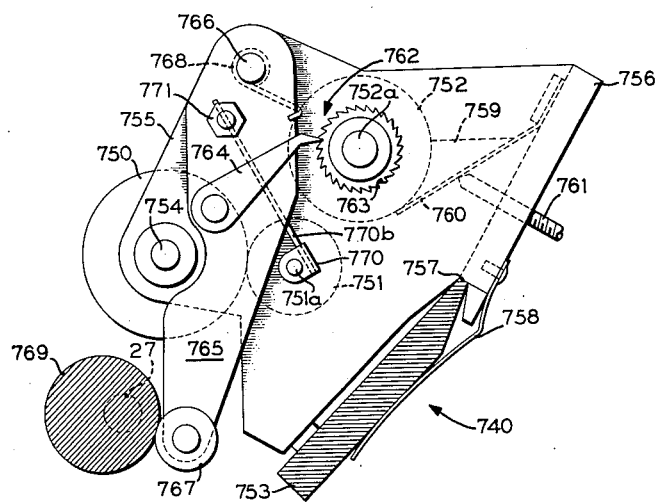
FIG_13_

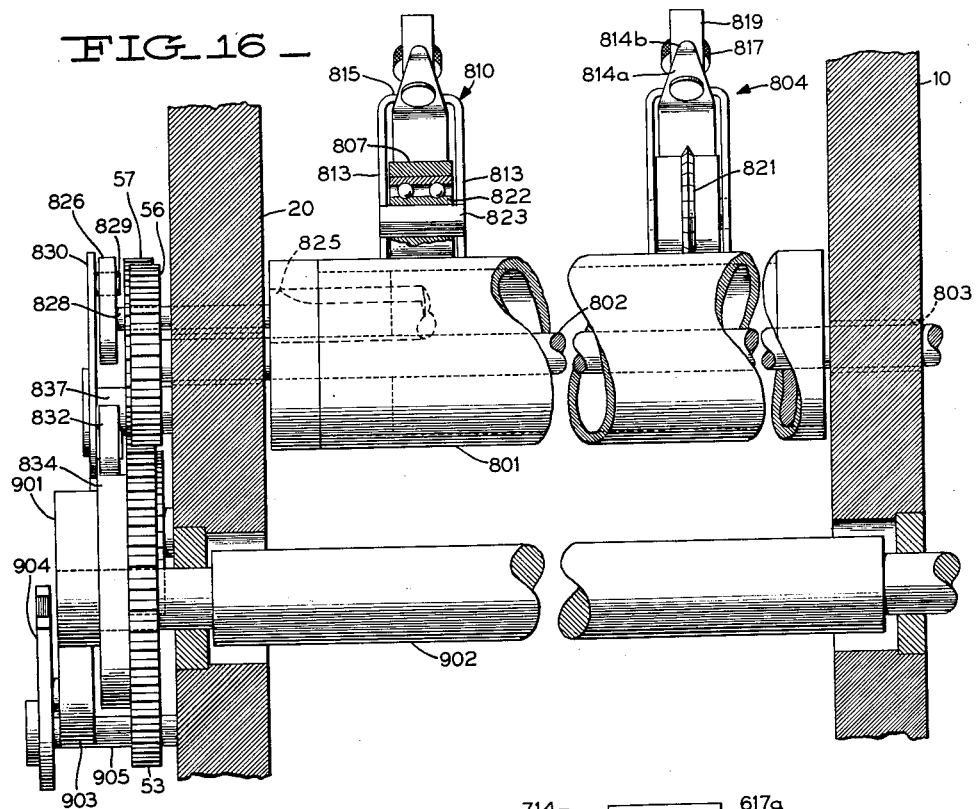
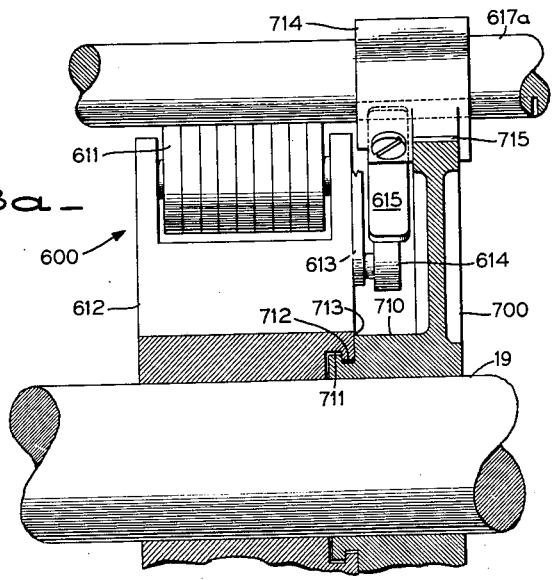

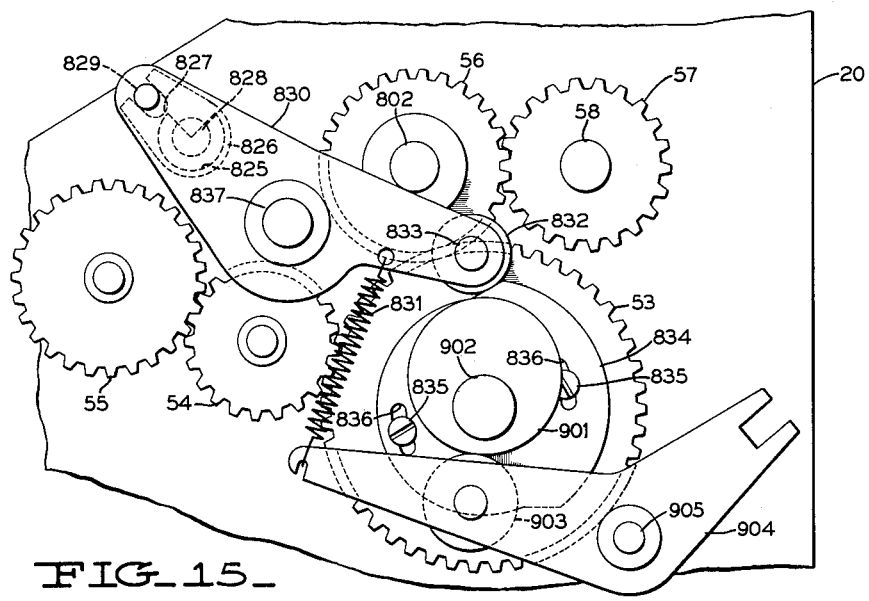
FIG_15_
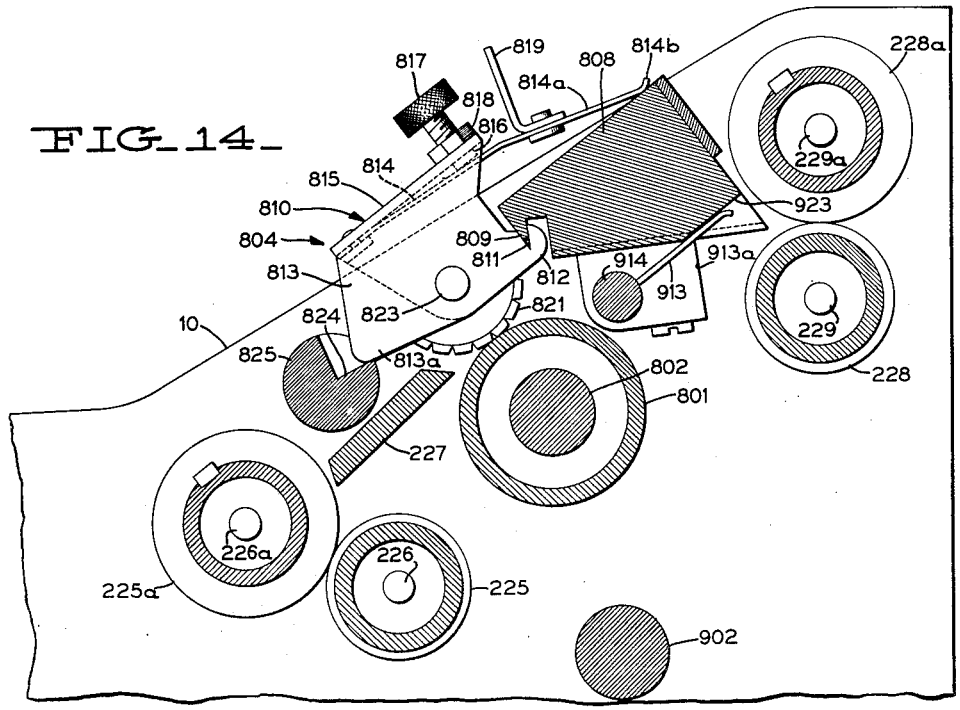
FIG_14_

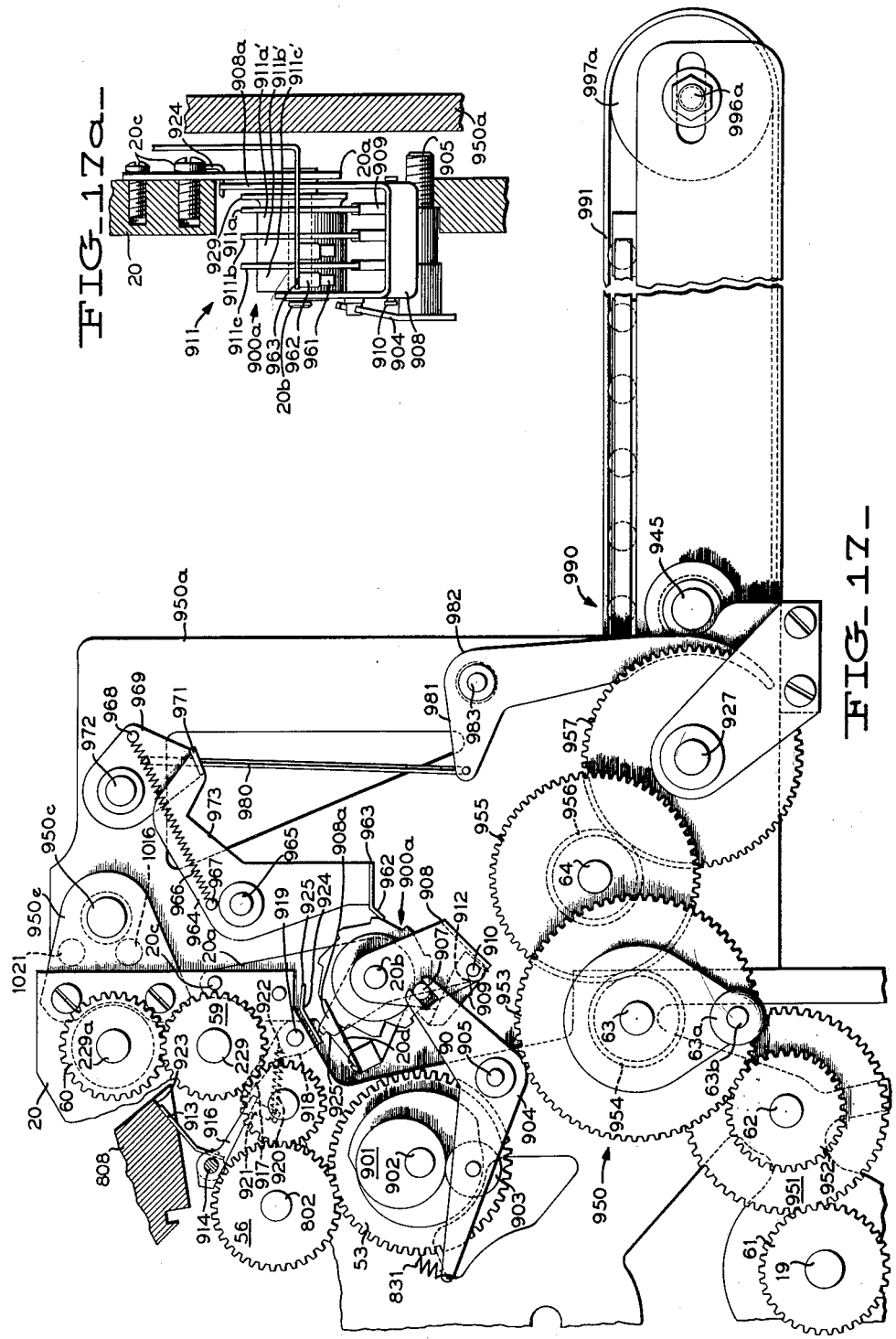

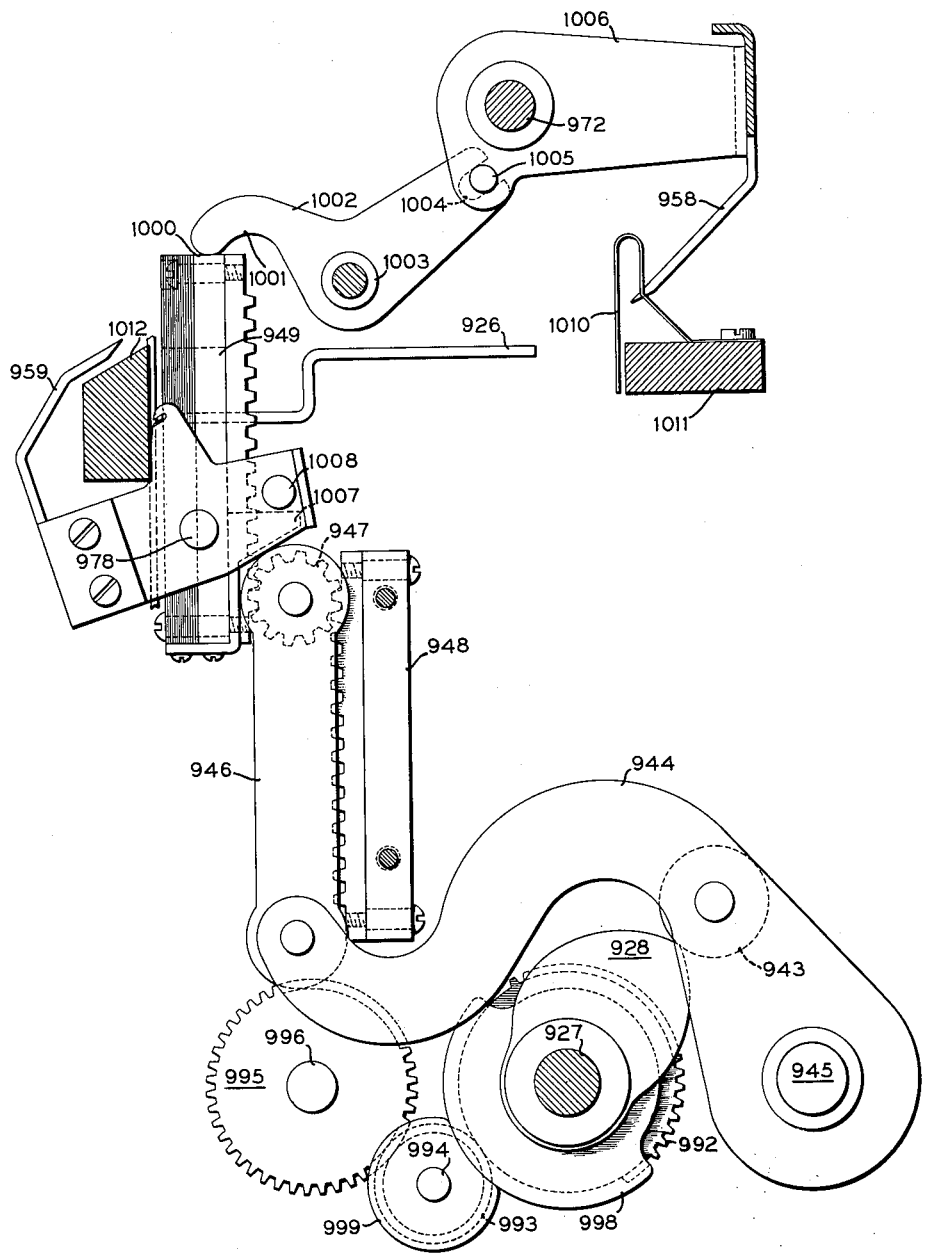
FIG_18_

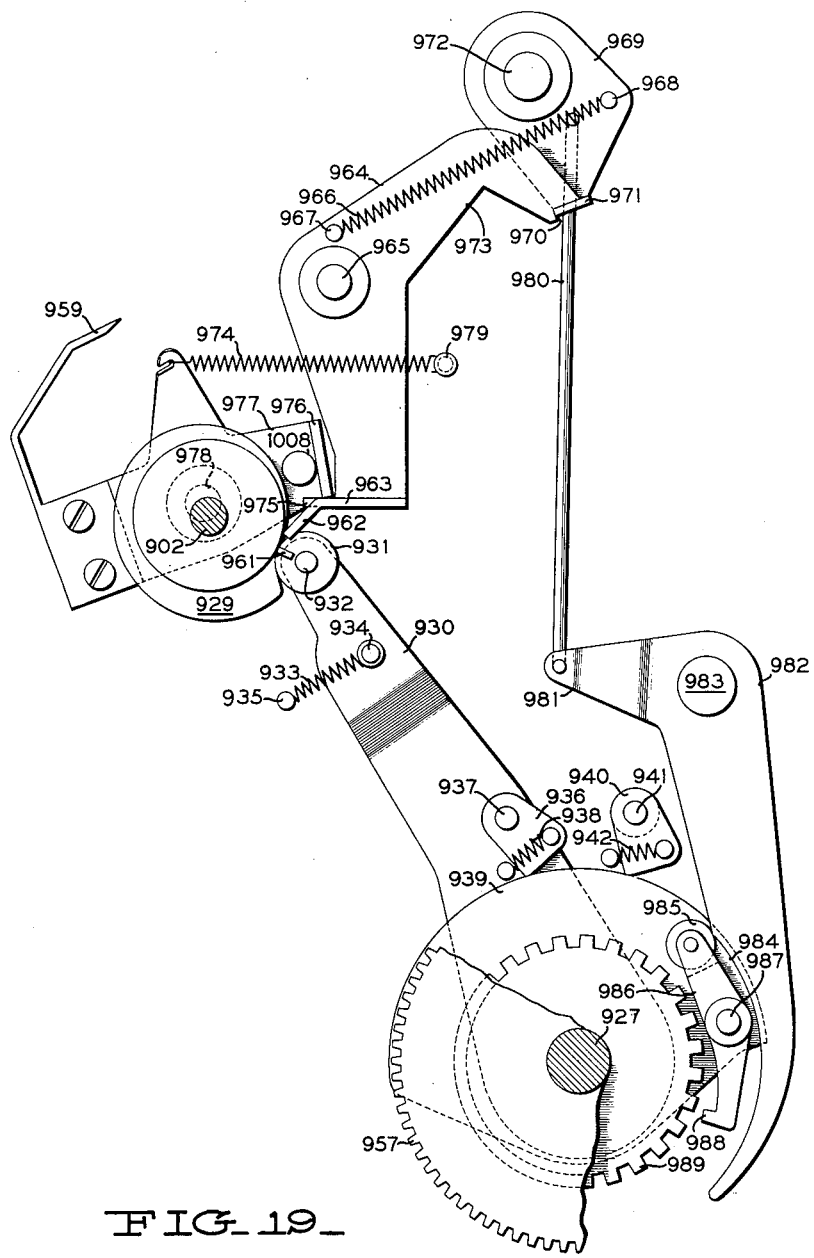
FIG_19_

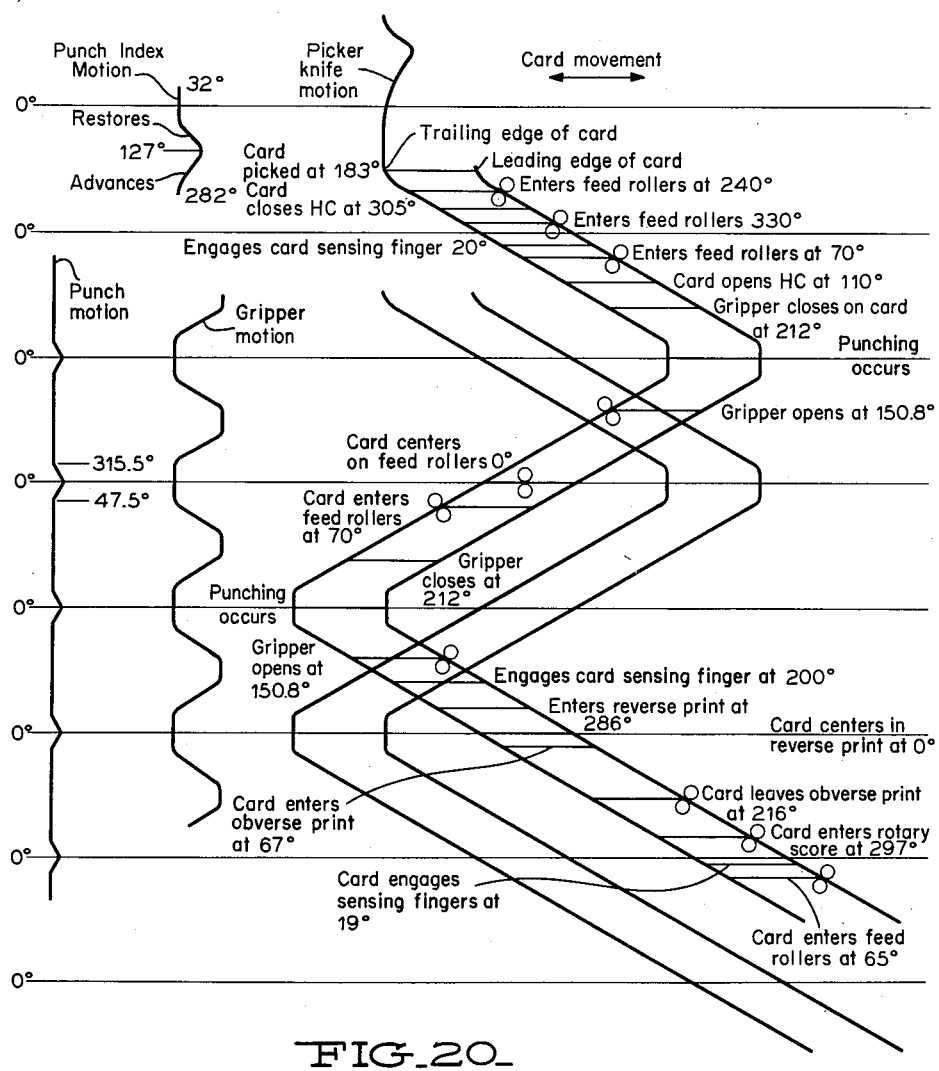
FIG_20_

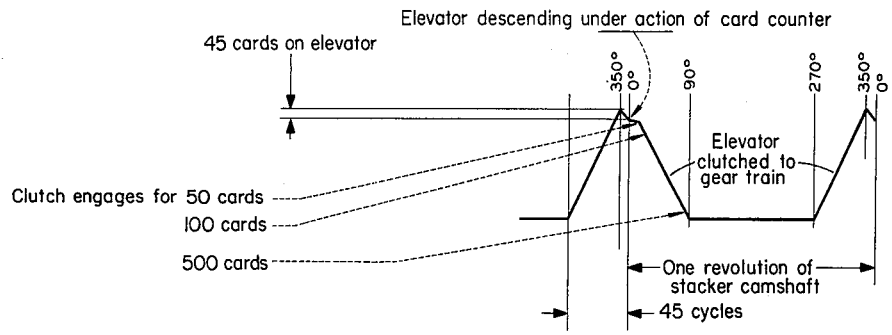
FIG_21_
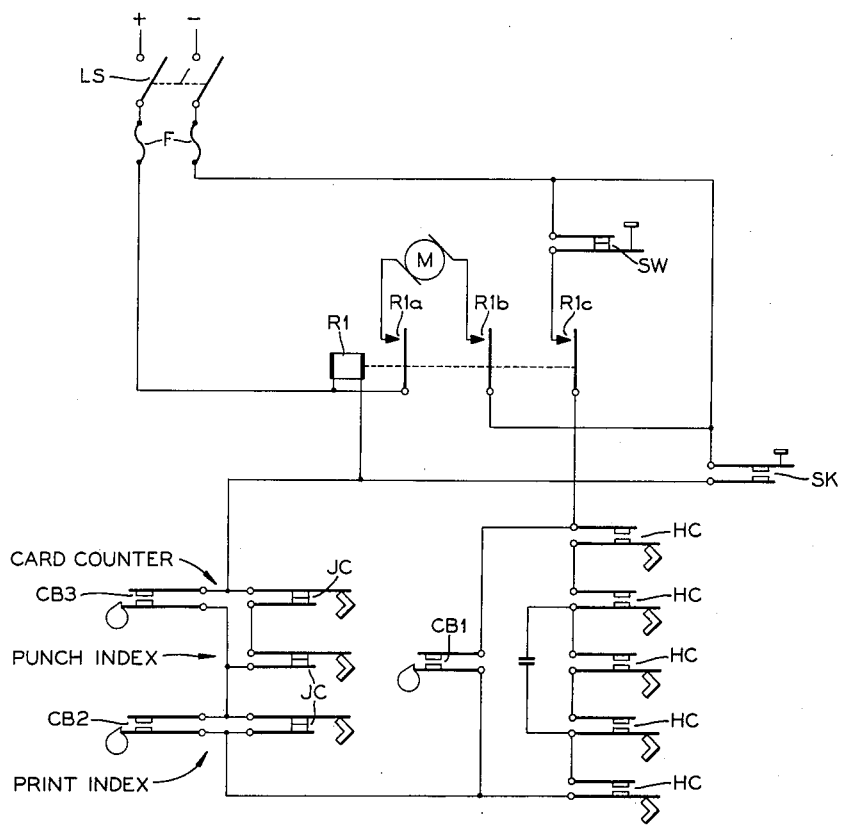
FIG_23_

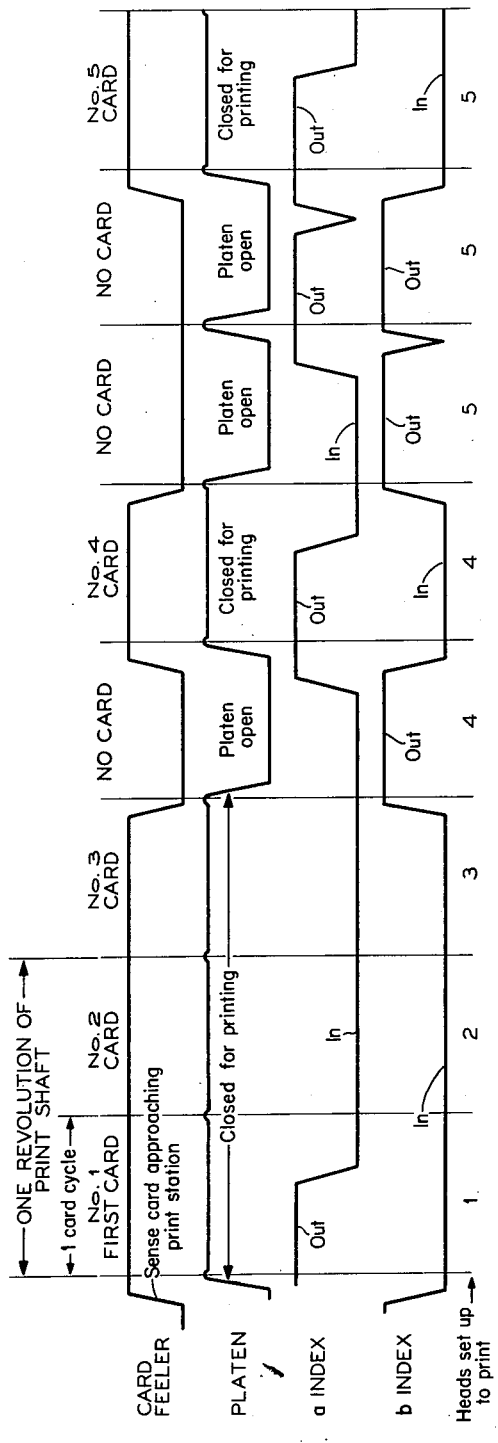

United States Patent Office 3,033,564
Patented May 8, 1962

3,033,564
ARTICLE STACKING APPARATUS
Fred M. Carroll, Binghamton, and Grey M. Gurley, Endwell, N.Y., assignors to International Business Machines Corporation, New York, N.Y., a corporation of New York
Original application Sept. 19, 1957, Ser. No. 684,897, now Patent No. 3,015,264, dated Jan. 2, 1962. Divided and this application Jan. 27, 1960, Ser. No. 4,971
9 Claims. (Cl. 271—83)

This invention relates to apparatus for receiving and stacking articles such as record cards and, more particularly, relates to article receiving and stacking apparatus positively operated to progressively change its position under control of apparatus for detecting articles entering therein.

This application is a division of copending application of Fred M. Carroll et al., Serial No. 684,897, filed September 19, 1957, for Record Card Processing Machine, now Patent No. 3,015,264, granted Jan. 2, 1962.

Article stacking devices known heretofore do not have the facility for progressively changing the stacking position by mechanism under control of an article detecting device. In the present invention, apparatus is provided to operate a stacker mechanism, whereby the same changes the stacking position progressively. The apparatus operating the stacker is under control of the device for detecting the articles entering the stacker. Further, the apparatus for operating the stacker is operable to move the stacker at two different rates. By this arrangement, the stacker is moved at a particular rate when articles are being stacked and at a faster rate when the stacked articles are to be transferred from the stacker to a conveyor and when the stacker is to be returned to the stacking position.

Accordingly, it is a prime object of the invention to provide an improved stacker which is positively operated to progressively change the stacking position under control of apparatus for detecting articles entering the stacker.

Another very important object of the invention is to provide an improved stacker which is operated at a rate dependent upon the rate at which articles are being stacked and at a faster rate when the articles are to be transferred from the stacker and when the stacker is to be returned to the stacking position.

Another object of the invention is to provide an improved stacker which is operated positively at all times.

Other objects of the invention will be pointed out in the following description and claims and illustrated in the accompanying drawings, which disclose, by way of examples, the principle of the invention and the best mode, which has been contemplated, of applying that principle.

In the drawings:

FIGS. 1a, 1b, 1c and 1d together constitute a schematic view of the machine showing a card progressing therethrough.

FIGS. 2a and 2b together constitute a plan view of the machine without the card stacker and conveyor.

FIG. 3 is a plan view of the stacker and conveyor.

FIG. 3a is a detail view in rear elevation of the card patters and mounting means therefor.

FIG. 3b is a detail view of the clamp for the card patters.

FIG. 4 is an outside elevation view of the right-hand side of the machine without the rock shaft actuating mechanism and the card stacker and conveyor.

FIG. 5 is an outside elevation view of the left-hand side of the machine without the card stacker and conveyor.

FIG. 6 is a partial detail side elevation view of the card feed mechanism.

FIG. 6a is a detail side elevation of the portion of the back stop casting not shown in FIG. 6.

FIG. 7 is a partial detail front elevation view of the card feed mechanism.

FIG. 8 is a detail view partially in section and partially in full line showing the card positioning mechanism and the drive mechanism therefor.

FIG. 9 is a detail view partially in section and partially in full line of the punch unit and the punch indexing mechanism.

FIG. 10 is a detail view of the drive mechanism for the punch units and the card positioning mechanism.

FIG. 11 is a detail view of the print indexing mechanism.

FIG. 12 is a partial detail view of the drive arrangement for the platens.

FIG. 13 is a detail view of the printer inking mechanism.

FIG. 13a is a detail view of the print head and feed roll.

FIG. 14 is a detail side elevation view of the rotary score mechanism.

FIG. 15 is a detail view of the drive arrangement for the rotary score mechanism.

FIG. 16 is a detail front elevation view of the rotary score mechanism.

FIG. 17 is a detail view of the card counter and card stacker mechanism.

FIG. 17a is a partial detail view of the card counter.

FIG. 18 is a detail view of the card elevator drive mechanism.

FIG. 19 is a detail view of the clutch mechanism for the stacker drive unit.

FIG. 20 is a timing diagram showing the movement of a card through the machine.

FIG. 21 is a timing diagram showing the operation of the card elevator.

FIG. 22 is a diagram illustrating the operation of the print indexing mechanism.

FIG. 23 is an electrical control diagram.

FIG. 25 is a diagram indicating the relationships of FIGS. 1a, 1b, 1c and 1d.

General

Figure 24:
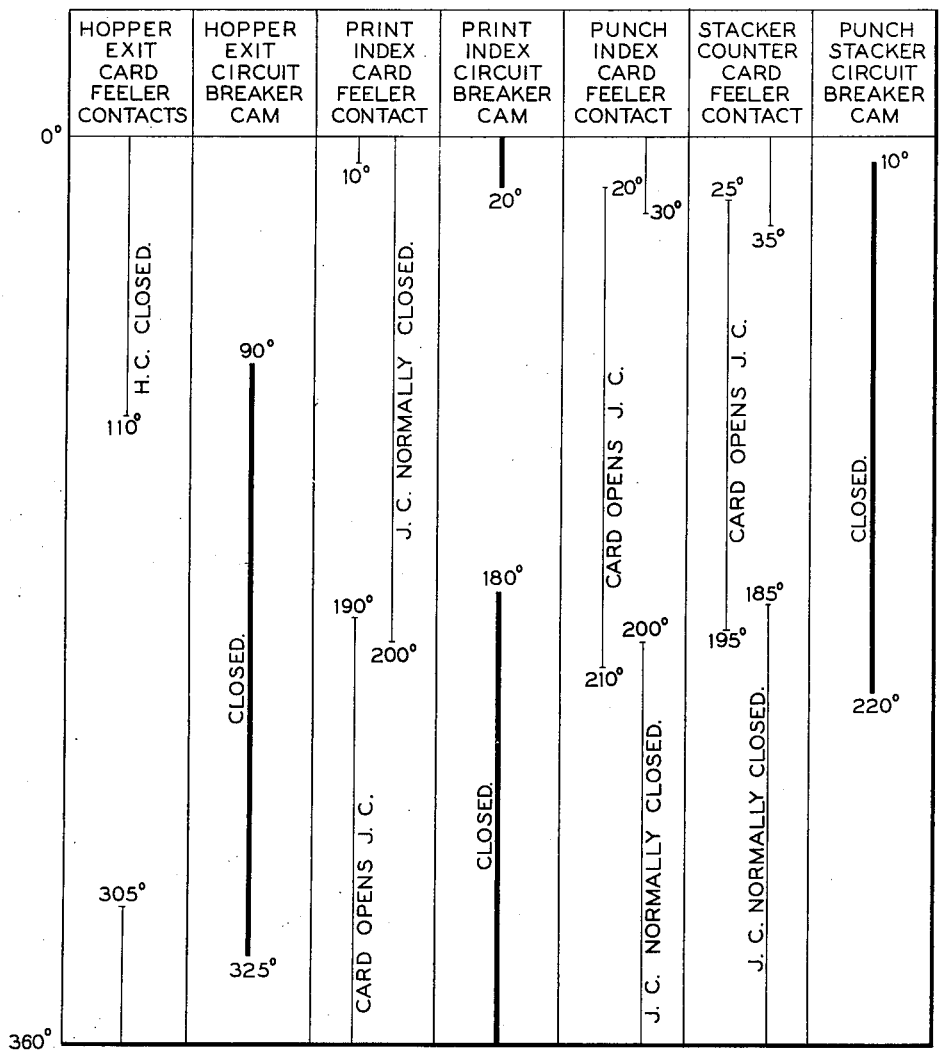
FIG. 24 is a timing diagram indicating operation of hopper and jam contacts forming part of the electrical control system.

As the use of record cards becomes more diversified, it is becoming necessary to provide auxiliary processing machines to perform special operations on the cards prior to their use in the field. Of course, it is desirable to have one machine capable of performing these operations on the various sizes of cards found to be in use in record card controlled machines, such as continuous form cards which are wider and longer than the standard record card, standard record cards, standard record cards with stubs and short cards which have fewer columns than the standard record card.

The size of card which the auxiliary processing machine can perform operations upon has been selected to correspond to the dimensions of the continuous form card which is the longest and widest of the cards to be processed. The operations of serial number punching, punching a particular configuration into a card, such as a tag hole for use of cards in the garment industry, serial number printing on both sides of a card corresponding with the serial numbers punched in a card, scoring and creasing a card, and counting and stacking cards are performed on these various sizes of cards by locating the operational units to the proper position with respect to the cards.

Of the operations performed, the serial punch operation is the most critical in that the perforations must be entered into a card at the correct index position in order that the card will subsequently be capable of properly operating a record card controlled machine. In the past, complicated sensing mechanisms have been employed to properly register a card for punching; however, in this invention the punch units are located with respect to the index positions on a record card by means of a stationary index bar having grooves corresponding to the index positions of a maximum capacity record card.

Control mechanisms are provided to stop the machine in the event cards fail to feed properly through the machine or jam in the machine, as well as for rendering inoperative the indexing mechanisms for punching, printing and card counting units when a card is skipped. Further, a means is provided for moving the platens of the printing units from print position so that the print heads will not print upon them in the absence of a card. Also a means is provided to lift the scoring mechanism from the anvil roll during the portion of a card cycle not occupied by a card, thereby materially increasing the life of the scoring unit.

In the sequence of operation of the machine cards are fed from a hopper 100a, FIG. 1b, and conveyed to be positioned in a first punch station 500a, FIG. 1a, removed from the first punch station 500a to be positioned in a second punch station 500b, conveyed from the second punch station 500b to a printing station 610, FIG. 1b, for printing on the reverse side of the card, advanced from the reverse side printing station to a station 620 for printing on the obverse side of the card, moved from the obverse printing station 620 to the scoring station 800, FIG. 1b, and transported from the scoring station 800 to the card counting and stacking station 900, FIG. 1c.

Machine Drive Arrangement

In general, a gear drive 1, FIGS. 2a and 2b, is provided for transmitting driving power from a power source, not shown, to the various operational units of the machine generally described above, so that the operational units will be driven in a timed relationship with each other. The timing of the machine is shown in FIGS. 20 and 24.

A single source furnishes power for the entire machine. The gear drive 1 comprises a gear drive 1a for the operational units requiring a large amount of power, FIGS. 2a and 5, and a gear drive 1b for operational units requiring less power. The gear drive 1a is located on a frame member 10 or left-hand side of the machine in viewing the card hopper 100a from the front. A portion of the power supplied to the gear drive 1a is transmitted to the gear drive 1b located on a frame member 20, FIGS. 2b and 4, to drive the operational units requiring less power.

The power source, not shown, is connected by means of a belt also not shown to a pulley 2, FIG. 2a, journalled on a shaft 11, FIG. 5, fixed in the frame member 10. A pinion gear 12 is fixed to the hub of the pulley 2 or integral therewith to be in mesh with a bull gear 13 journalled on a shaft 14 fixed in the frame member 10. An intermediate gear 15 also journalled on the main shaft 14 is fixed to the gear 13 to turn therewith. The gear 15 is in mesh with a bull gear 16 fixed to a cam shaft 17 and with a bull gear 18 fixed to a print drive shaft 19 for the reverse printer 610.

The cam shaft 17, FIG. 10, is journalled in the frame member 10 and the frame member 20 and carries cams 381, 381a and 336, 336a near each end for driving the punch mechanisms 500c and card positioning mechanisms 300 respectively. The print drive shaft 19 also journalled in the frame members 10 and 20 carries the print unit for printing on the reverse side of a record card being processed. Concentric with and on the same end of the shaft 19 as gear 18 is a smaller gear 23 meshed with an idler gear 24 journalled on a shaft 25 fixed in the frame member 10. The idler gear 24 meshes with a gear 26 fixed to an inker cam shaft 27 at the reverse printing station 610. The gear 18 is also in mesh with a bull gear 28 fixed to a print drive shaft 29 for the obverse printer 620 which is journalled in the frame members 10 and 20. The gear 28 is also in mesh with an idler gear 30 journalled on a shaft 31 fixed in the frame member 10. The idler gear 30 in turn is in mesh with a gear 32 fixed to a card counter cam shaft 902 journalled in the frame members 10 and 20.

As stated above a portion of the drive 1 emanating from the left-hand side for heavier drive is transferred to the right-hand side for the operating units requiring less power. The cam shaft 17 which furnishes power for the punch mechanisms 500c and card positioning mechanisms extends across the machine and through the frame member 20, FIG. 4.

A bull gear 33 is fixed on the portion of the shaft 17 extending through the frame 20 to be in mesh with an idler gear 34 journalled on a shaft 35 which also journals a gear 36 fixed to the idler gear 34. The gear 36 is in mesh with a gear 37 fixed to a shaft 218 for carrying a feed roller 217 and gear 39 fixed on a shaft 212 for carrying a feed roller 211 to be in mesh with an idler gear 41 journalled on a stud shaft 42 fixed in the frame member 20. The idler gear 41 meshes with a gear 43 on a shaft 204 which carries a feed roller 203. The gear 43 is in mesh with a gear 44 fixed to a shaft 204a carrying the cooperating feed roller 203a and with a gear 45 journalled on a stud shaft 137 fixed in the frame member 20 and carrying a picker knife cam 130. The shafts 204 and 204a are journalled in the frame members 10 and 20. The gear 45 also meshes with a gear 46 fixed to a feed roller shaft 201 mounting a feed roller 200, the gear 46 being in mesh with a gear 47 fixed on a feed roller shaft 201a carrying a cooperating feed roller 200a.

The gear 36 is also in mesh with a gear 48 on a shaft 215 carrying a feed roll 214, the gear 48 being in mesh with a gear 49 fixed on a cooperating feed roll shaft 215a.

Hence it is seen that the card feed mechanism 100 and the card positioning mechanism 300 to transport a card into and out of the punching stations 500a and 500b are driven from the cam shaft 17 through the gearing afore-mentioned.

An inker cam shaft 50 at the obverse printing station 620 is driven by a gear 51 fixed thereto and in mesh with a bull gear 52 fixed to the portion of the shaft 29 extending through the frame member 20. Feed rollers 225 and 225a are driven from the counter cam shaft 902. A gear 53 fixed to the counter cam shaft 902 is in mesh with a gear 54 fixed on a feed roll shaft 226 to be in mesh with a gear 55 fixed to a cooperating feed roll shaft 226a. The gear 53 is also in mesh with a gear 56 fixed to a shaft 802 carrying an anvil roll 801. The gear 56 through an idler gear 57 journalled on a stud shaft 58 drives feed roll shafts 229 and 229a through a gear 59 fixed to the feed roll shaft 229 and a gear 60 in mesh with the gear 59 and fixed to the cooperating feed roll shaft 229a.

The drive for a stacker elevator 926 and conveyor 990, FIGS. 17 and 18, is obtained from the shaft 19 for the reverse printing unit. A gear 61 is attached to the portion of the shaft 19 extending through the frame 20 to be in mesh with a gear 951 fixed to a shaft 62 which also carries a gear 952 adjacent the gear 951. The gear 952 meshes with a gear 953 fixed to a shaft 63. A gear 954, FIGS. 4 and 17, journalled on the stud shaft 63 adjacent to the gear 953 meshes with the gear 955 on a shaft 64 also carrying a gear 956 in mesh with a gear 957 on a cam shaft 927.

A platen 671, FIGS. 11 and 12, at the obverse print station 620 is driven by a gear 65 fixed to the obverse print drive shaft 29 to be in mesh with a gear 674 fixed to a platen shaft 677. A platen 670 at the reverse print station 610 is driven by a gear 66 fixed to the reverse print drive shaft 19 to be in mesh with a gear 674a fixed to the platen shaft 677a.

Card Feed Mechanism

The card feed mechanism 100, FIGS. 1b, 6, 6a and 7, is adaptable to accommodate record cards of two different widths and has a maximum capacity for cards sixteen inches in length. Basically a card feed hopper 100a of modified conventional construction is supported on a slotted bar 101 horizontally positioned between the frame members 10 and 20 and fixed thereto by suitable fastening means. Feed hopper end plates 102 integrally containing picker knife guides 103 are supported on the bar 101 and may be positioned anywhere thereon by means of a clamp plate 104 and set screw 105 to accommodate cards of different lengths.

A guide plate 106 is fixed to each end plate 102 by means of set screws 107. The guide plate 106 has a slot 108, FIG. 6, to receive the set screws 107 to facilitate proper adjustment of the plate 106 for record cards of different widths. A base plate 109 to form a part of a throat assembly 110 for a card to pass through is positionable along a channel 111 in the bar 101. A series of tapped holes 112 properly spaced in the channel 111 receives a set screw 113 to hold the base plate 109 in a fixed position and to adjust the clearance between a throat knife 114 which in combination with the base plate 109 forms the throat assembly 110. The throat knife 114 is attached to a back stop casting 115 having a reduced shoulder 116 along its length with tapped holes 117 corresponding to the holes 112 to receive a set screw 118, for holding the throat knife 114 fixedly in position. The back stop casting 115 is fixed between the frame members 10 and 20. The upper portion of the back stop casting is not continuous, a removable sheet metal plate 119 is mounted to the back stop casting 115 to complete the back stop for the card hopper 100a. The plate 119 is supported by the back stop casting 115, FIGS. 6a and 7, by means of pins 120 fixed in the casting 115, to receive holes in the upper portion of the plate 119 and grooves 115a in the back stop casting 115 to receive the lower portion of the plate 119 and a bracket 119a, fixed to the plate 119, respectively. The easily removable plate 119 provides access to other elements of the machine to be described hereinafter.

A conventional picker knife 121 is provided to work in the guide 103. An offset arm 122 is fixedly attached to the picker knife 121 by means of screws 123. The end of the arm 122 carries a block 124 having two rectangular notches 125 in the form of rack teeth either of which is adapted to fit over a bail plate 126 having an end in the form of a one-tooth gear sector, the two notches 125 facilitate the feeding of extra-wide and standard-width cards. The other end of the bail plate 126 is attached to a plate 127 by screws 128. The plate 127 is carried by a rock shaft 129 pivotally supported between the frame members 10 and 20. Hence the picker knife 121 is positionable anywhere along the length of the bail plate 126. The rock shaft 129 is actuated by a cam 130 through a linkage arrangement. A Y-shaped arm 131 pivotally mounted on a pin 132 fixed to the frame member 20 has an offset portion 133 pivotally mounting a cam follower 134 on a pin 135 to follow the cam 130 fixed to the gear 45 by screws 136 to be driven thereby. The gear 45 and cam 130 are journalled on a stud shaft 137 fixed in and extending from the frame member 20, the gear 45 being driven through the gear train aforedescribed. The other member of the arm 131 is attached to one end of a link 138 by a pin 139, the other end of the link 138 is attached by a pin 140 to an arm 141 rigidly attached at one end to the rock shaft 129 and biased at its other end by a spring 142 attached thereto and to a stud 143 fixed to the frame member 20. The spring 142 maintains the cam follower 134 in contact with the cam 130.

From the foregoing it is seen that the card hopper 100a may be adjusted to accommodate the various sizes of cards both in length and width and correspondingly the movement of the picker knives 121 is also adjustable. Both the card hopper 100a and picker knives 121 are positionable anywhere along the width of the machine.

Card Conveyor

The mechanism constituting the card conveyor 200b comprises means for transporting the cards from the aforementioned operating stations one to another. The means for positioning the cards for a punching operation will not be described as a portion of the card conveyor 200b but will be described hereinafter as a card positioning mechanism 300. The distinction being purely arbitrary is made for the purposes of clarity and in keeping with the concept the machine comprises a plurality of interrelated cooperating units.

The card feed mechanism 100 afore-described and the card positioning mechanism 300 to be described hereinafter are arranged to operate with the card conveyor 200b in a timed relationship as shown in the timing diagram of FIG. 20. In General, FIGS. 1a, 1b, 1c and 1d, the card conveyor 200b comprises a series of cooperating feed rollers positioned between the above-described operating stations. At each of the punch stations 500a and 500b, a common roller cooperates with the two other rollers to comprise two sets of cooperating rollers. The rollers are contained on fixed centers in a manner that the periphery of the rollers just touch each other. Hence to allow for proper feeding of the cards, one roller is quite resilient so that it will compress during the feeding of the card. The rollers are of odd diameters to provide for more uniform wear, since by this arrangement the cards will be gripped at successively different points on the peripheral surface of the rollers. The rollers rotate to feed one card per cycle, whereas the printing heads to be described hereinafter rotate one-half revolution per cycle to feed the cards during the printing operations. Card guides located between the cooperating rollers to properly guide and direct the cards as they move through the machine are supported by frame members 10 and 20 of the machine. The said guides vary in shape according to the manner in which they are to guide the cards.

Accordingly, there is a pair of rollers 200 and 200a journalled on shafts 201 and 201a, respectively, to receive a card from the card feed mechanism afore-described. The card is transported by the rollers 200 and 200a through a card guide 202 to a pair of rollers 203 and 203a journalled on shafts 204 and 204a respectively, for feeding the card between a card feeler 481 and card guide 205, the operation of the card feeler 481 to be described later herein, to another pair of rollers 206 and 206a, journalled on shafts 207 and 207a, respectively. The feed rollers 206 and 206a feed the card through card guides 208 and 209 to the card positioning mechanism 300 at the first punch station 500a. Subsequent to a punching operation at the first punch station 500a, the card is delivered by the card positioning mechanism 300 between card guides 209 and 210 to a feed roller 211 journalled on shaft 212 and cooperating with the feed roller 206a. From cooperating feed rollers 206a and 211, the card feeds through card guides 213 to a pair of rollers 214 and 214a journalled on shafts 215 and 215a, respectively. The feed rollers 214 and 214a then feed the cards through card guides 216 to another pair of rollers 217 and 217a journalled on shafts 218 and 218a, respectively, and operating to feed the card between card guides 219 and 219a to the card positioning mechanism 300 at the second punch station 500b. Following a punching operation at the second punch station, the card is transported by the card positioning mechanism 300 between card guide 219a cooperating with card guide 220 to a feed rollers 221 journalled on a shaft 222 to cooperate with the feed roller 217a.

The cooperatnig feed rollers 217a and 221 feed the card between a card feeler 640 and card guide 644 into the printing station 610 for printing serial numbers on the reverse side of the card, the details of the printing operation to be described hereinafter. As the card is being printed upon, the printing mechanism moves the card through card guides 223 to the printing station 620 for printing on the obverse side of the card in a manner similar to the printing station 610. As the card is being printed upon its obverse side, it feed through card guides 224 to a pair of rollers 225 and 225a journalled on shafts 226 and 226a, respectively, for feeding the card past card guide 227, through a scoring mechanism 800 and between a card guide 808 and a card sensing finger 913 to a pair of rollers 228 and 228a journalled on shafts 229 and 229a, respectively. The feed rollers 228 and 228a then feed the card to a card stacking mechanism 900. All of the feed rollers are driven by the gear drive aforedescribed.

Card Positioning Mechanism

The card positioning mechanism 300, FIG. 8, is a unit for positioning a card for a punch operation. To position a card two or more units are used in combination, the number of units to be used depends upon the size and number of cards being operated upon at any one time. In general, the unit 300, FIG. 8, comprises a card gripper mechanism 300a contained between identically shaped frame members 301. The unit 300 is mounted in any selected position along cross-head slipper plates 305a and 305b. The frame members 301 have a longitudinal slot 302 to receive a record card. The upper end of the frame members 301 has a notch 303 to fit into a notch 304 running the length of the cross-head slipper plate 305a. A U-shaped latch 306 pivotally supported by a pin 307 fixed between the frame members 301 with the U portion about the frame members 301 is biased by a spring 308 attached between the back of the U and a block 309 interposed between the frame members 301 at their lower end which has a recess to receive the spring 308. The nose 311 of the latch 306 is hookshaped to fit into a notch 312 in the cross-head slipper plate 305b to hold the notch 303 into the mating notch 304. A flange 301a integral with the frame member 301 aids in supporting the unit 300 onto the slipper plates 305a and 305b.

The block 309 also has a notch 313 which serves as a rest for a base plate 314 of the gripper mechanism 300a. A support plate 315 fixed to the base plate 314 by rivets 316 pivotally mounts a gripper head 317 on a pin 318. The gripper head is biased toward the base plate 314 by a flat spring 319 attached by the rivets 316 to the support plate 315. A resilient link 320 is attached on one end by the rivets 316 to the support plate 315, the other end of the link 320 protrudes beyond a hook-shaped arm 321 attached to it by rivets 322. The hook-shaped arm 321 is adapted to hook into a longitudinal slot 341 in a movable bail 340 actuated through linkage by the shaft 17. Hence the bail 340 facilitates a drive to the unit 300 for operating the gripper mechanism 300a wherever the unit 300 is positioned. A block 323 fixed between the frame members 301 has a sloping side 324 to engage the tail 325 of the gripper head 317 to pivot the head about the pin 318 against the spring 319, thereby opening the gripper to receive a card which has entered into the slot 302. A block 326 fixed between the frame members serves to mount a card stop 327 by means of a screw 328. The card stop 327 has a slot 329 to permit either of two holes 331 in the card stop 327 to locate the card stop 327 on a dowel pin 330 fixed in the block 326 to extend outwardly therefrom. This arrangement provides for precise adjustment of the card stop 327 to accommodate the various width cards. A roller 332 mounted on a pin 333 between the frame members 301 prevents the link 320 from disengaging from the bail during a punching operation. The frame members 301 are spaced apart by means of a spacer 334.

The shaft 17 driven by the shaft in the afore-described manner carries cam 336 having a cam track 336a. A yoke arm 337 carrying a cam follower 338 fits about the shaft 17 and is disposed to slide up and down the shaft 17 as the cam follower 338 follows the cam track 336a. The lower end of the yoke arm 337 is connected by a pin 345 to an arm 338 pivotally mounted on a pin 339 fixed in the frame 10. The gripper bail 340 is fixed to an arm 342 pivoted about a pin 343 fixed to a flange 344 extending inwardly from an index registration bar 504. Similarly, another gripper bail 340a for the second punch station is fixed to an arm 342a pivoted about a pin 343a fixed to a flange extending inwardly from an opposing index registration bar 504a. The arms 342 and 342a are connected to the end of the yoke arm 337 by links 347 and 347a, respectively. The gripper bails 340 and 340a are carried between links identically arranged on the other end of the machine in the manner of arms 342 and 342a. Also there are links and a yoke identical to the links 338, 347 and 347a and yoke 337.

Hence the link 320 hooks into the slot 341 anywhere along the length of the bail 340. It is not necessary that the hook actually be inserted into the slot 341, since the hook automatically hooks as the bail 340 is actuated due to the protruding portion 320a of the link 320.

Serial Number Punch Mechanism

A serial number punch mechanism 500c, FIG. 9, provided to punch serial numbers from 0 to 100,000,000 in the cards being processed is mounted at the first punch station 500a. There are ten punches in a column for the units position through the hundred thousandths position, while there are twelve punches in a column for the millions position through the hundred millionths position, thereby furnishing punches for the eleven and twelve index positions.

The mechanism for indexing the punches to be described hereinafter is associated with the punch mechanism 500c in a manner that the punch mechanism and indexing mechanism constitute a single unit, FIG. 9, which may be mounted anywhere desired along opposing registration bars 504 and 504a by means of a bolt 505 and nut 506 and on the cross-head slipper plate 305b by means of a retaining plate 507 and a screw 598, a groove 509 on cross-head slipper plate 305a receives a mating dove tail 510 on the punch unit. An index key 503a locates the punch mechanism with respect to the registration bar 504. In general, a punch head 500 containing punches 501 is held stationary and a die and stripper unit 502 is movable toward the punches 501 to accomplish the punching. Hence by sequentially interposing the punches 501, cards will be punched in serial order. A mounting bar 503 containing the punch head 500 at its upper end is mounted on the registration bar 504 by the bolt 505 and nut 506. Both the registration bar 504 and the mounting bar 503 have mating grooves which correspond to the index positions on a record card so as to accurately locate each punch 501 with respect to the index positions on the cards being processed. The die and stripper 502 is located by means of dowel pins 511 with respect to the punch head 500 so that punches 501 align with the die holes 512. The die and stripper unit 502 held together by bolts 513 consists of die support bar 514 having the groove 510 at one end to mate with the groove 509 on the crosshead slipper plate 305a, a die spacer plate 515, and a die plate 516 fastened to the die support bar 514 by rivets, not shown. A card gap spacer plate 518 allows for a card to enter between the die plate 516 and stripper plate 519. The stripper plate 519 and stripper spacer plates 520 are fastened by rivets 521 to a stripper support bar 522, and a punch lock bar 523 retained over the stripper support bar by L-shaped plates 524 is fastened to said stripper support bar 522 by screws 525. Similarly, a punch lock bar 523 is retained on the mounting bar 503 by L-shaped plates 524a fastened by screws 525a to said mounting bar 503. The dowel pins 511 are press fitted into a hole bored through the afore-mentioned components of the die and stripper unit 502, thereby accurately locating the components with respect to each other.

The dowel pins 511 are slidable in bushings 526 contained in the support bar 503. The die plate 516 and the stripper plate 519 at their ends are offset from each other at an angle to facilitate entry of a record card therebetween. A bolt 527 fitted through a counter-bored hole in the die and stripper unit 502 and threaded through a spring 528 into the support bar aids in keeping the punching mechanism together when the punch unit 500c is not mounted upon the machine.

*Serial Punch Index Mechanism*

A serial punch index mechanism 400, FIG. 9, provided to index the punches 501 as cards are processed mounts onto the bar 503 of the punch unit 500c by means of bolts 490.

Generally speaking, the index mechanism 400 indexes automatically; however, manual setup is used for serial numbers of the order one million and above, since the setting for these numbers would occur infrequently. Further, the indexing mechanism is capable of indexing from low to high order numbers or from high to low order numbers.

There are three basic units to the indexing mechanism: an interposer unit 400a, a ratchet unit 410 for indexing from low to high order, and for indexing from high to low order, and a detent unit 420.

The interposer unit 400a comprises a series of gears 401 with lugs 402 on the face of each gear 401. As the gears 401 rotate a lug 402 is brought over the top of each punch 501 in succession, thereby setting up the punches serially.

The gears 401 are driven by the ratchet unit 410 which consists of a series of gears 411 in mesh with the gears 401. Each gear 411 has a ratchet wheel 412 fixed thereto. The ratchet wheels 412 each have two sets of ten teeth, nine teeth of each set of the same depth, are equally spaced around the periphery of the ratchet, the tenth tooth is cut deeper to provide a carry over to the next ratchet wheel.

The detent unit 420 serves to prevent the gears 401 from indexing out of order as well as a sight indicator to indicate to the machine operator the serial number set up to punch. The detent unit 420 consists of a series of gears 421 in mesh with the gears 401 and a detent wheel 422 fixed to each gear 421. The detent wheel 422 has a plurality of teeth 423 arranged around its periphery in a manner to receive rollers 424a mounted on arms 424 and disposed to lie between any two teeth 423, the rollers 424a being spring biased to exert a drag on the detent wheel 422.

Cover plates 450 for mounting the indexing mechanism 400 are fixedly attached to blocks 487 by means of screws, not shown, threaded into holes 451. The blocks 487, it will be remembered, are attached to the bar 503 by bolts 490. The gears 401 are journalled on a stud 403 fixed between the cover plates 450. The gears 411 and ratchet wheels 412 are also journalled on studs 413 held between the cover plates 450. The gears 411 and the detent wheels 422 are journalled on a stud 414 contained between the cover plates 450. A guide comb 401a for guiding the gears 401 is affixed to the cover plate 450.

The ratchet wheels 412 which drive the gears 401 through the gears 411 are acted upon by a dog 415 pivotally mounted on one end of a drive arm 460. The dog 415 has an arcuate head with steps 416 cut therein to act upon the ratchets 412 successively as the deeper teeth of the ratchet wheels 412 are encountered. The dog 415 is biased by a spring 417 attached to a pin 418 fixed to the dog 415 and to one end of a lever 419 pivotally mounted on a pin 461 fixed in the cover plate 450. The other end of the lever 419 projects through an arcuate slot 462 in the cover plate 450 to allow the machine operator to move the lever 419 to the position desired so as to index in ascending or descending order. The drive arm 460 pivoted about a pin 463 fixed between the cover plates 450 carries a fixed roller 464 on its other end and is urged by a spring 465 in a manner that the roller 464 will follow a bail 466 which extends across the width of the machine between the frame members 10 and 20; hence, wherever the serial number punch unit is positioned, the drive arm 460 will be in contact with the bail 466. The bail 466 being a steel tube, FIG. 4, is fixed between two arms 467 each pivoted on stud pins 468 fixed to extend from frame members 10 and 20. One end of the bail 466 extends through an aperture 469 in the frame member 20. An arm 470 is carried on the end of a stud shaft 471 which fits into the bail 466 and held thereto by a set screw, not shown. The arm 470 is offset in a mannner that a roller 472 carried on the end of the arm 470 will be actuated by the picker knife cam 130. A spring 467a connected to the arm 467 and a pin 467b maintains the roller 472 in position to be engaged by picker knife cam 130. Movement of the bail 466 will cause the dog 415 to index the serial punch one digit, if a card is present; however, in the event a card is not present a latch mechanism 473 prevents the bail 466 from moving. As it will be seen in describing the operation of the latch mechanism 473, the picker knife cam 130 lifts the link 470 to operate the latch mechanism 473 on the rise of the cam and allows movement of the bail 466 under action of the spring 467a to actuate the dog 415 on the fall of the cam 130. Therefore, if a card is not present, the latch mechanism will not allow the bail 466 to move, however, without interfering with the movement of the cam 130 since cam 130 only restores the bail 466. The latch mechanism 473 comprises an arm 473a pivotally mounted about a pin 474 fixed to the frame member 20. The arm 473a having a recessed portion 475 on one end latches up with a flange member 476 on the arm 467, this flange member 476 is adjustable to allow setting of the latch point. The other end of the arm 473 is held in contact with one end of an arm 477 fixed to a shaft 478 journalled in supports, not shown, by a spring 479 fixed to a pin 482 on the arm 473 and a pin 480 located on the arm 477 at a distance that the spring 479 will bias sensing fingers 481 fixed to the shaft 478 against the card guide 205, since the effective lever arm which is from the center of the pin 474 to the center line of the spring 479 is shorter than the effective lever arm from the center of the shaft 478 to the center line of the spring 479.

Hence when a card approaches the first punch station 500a, it passes between the sensing fingers 481 and the card guide 205 to pivot the sensing fingers 481 about the center of the shaft 478, thereby rotating the shaft 478. This arrangement permits movement of the sensing finger 481 even though the arms 467 have not been pivoted by the action of the cam 130. This action causes the arm 477 to rotate, thereby unlatching the arm 473 from the arm 467 and allowing the bail 466 to move to advance the serial punch by action of the dog 415 as the cam follower follows the fall of the cam, the spring 467a provides the power for moving the bail. The arm 473 latches the bail 466 through the arm 467 when the cam follower 472 goes over the high point of the rise of the cam 130.

Hence if a card does not pass the sensing fingers 481, the arm 473 will remain latched with the arm 467 and therefore, the bail 466 will not be moved by the spring 467a and consequently, the serial punch will not be indexed.

The manual setup for the punches in the millions through the hundred millions position consists of two slide interposers 483 and 483a for each position, one slide 483 being for the zero, eleven and twelve index positions on a record card, the other slide 483a is for the punches zero through nine. The slides 483 and 483a are contained in a slide guide block 484 fixed to the bar 503. The slides 483 and 483a have a series of grooves 485 to receive a detent spring 486 fixed to a block 487 by a screw 488 and clamp 489. The block 487 is secured to the bar 503 by a bolt 490.

*Punch Drive Mechanism*

Generally, all punching is accomplished by moving the die unit 502 toward the punches 501, whether it be serial punching, gang punching, tag hole punching, corner cutting or some other special like type punching, FIG. 9. The die and stripper units 502 as previously stated are carried on opposing cross-head slipper plates 305a and 305b at the first and second punch stations 500a and 500b, respectively, while the punch heads 500 are fixed to the registration bars 504 and 504a. The cross-head slipper plates 305a and 305b are fixed on each end to cross-heads 305. Each cross-head 305, FIGS. 1a and 10, has a shaft 375 fixed thereto and journalled in a bearing support 376 and the slipper plates 305a and 305b are supported on bearing blocks 377 to slide thereon. The bearing blocks 377 are fixed to the frame members 10 and 20. In FIG. 1a cam followers 378 journalled on pins 379 fixed to each cross-head 305 ride in the cam tracks 380 of cams 381 fixed to the cam shaft 17 adjacent the cross-heads 305. Hence as the cams 381 are rotated by the cam shaft 17, the cross-heads 305 are simultaneously moved away from each other, thereby moving the die and stripper units 502 toward the punch units 500. Hence wherever a punch 501 is held rigid either by an interposer 402 as in the serial punch mechanism or by a punch head, a hole will be punched in the card as the card is brought against the punch by the die and stripper unit. In the case of the serial punch mechanism where an interposer 402 is not set up over a punch 501, the card merely moves the punch 501.

*Card Printing and Inking Mechanism*

In general, FIGS. 1b and 11, two printing stations are provided, a first station 610 for printing on the reverse side of the card and a second print station 620 for printing on the observe side. At either station the printing unit 600, FIG. 13a, is adjustably positioned laterally on the shafts 19 and 29 to print anywhere along the length of the cards. The printing units 600 are of the rotary type and more particularly are serial number printing units which print upon a card against platen rolls 670 and 671. There are two units for each print station; hence a card is printed upon for every half revolution of the shafts 19 and 29 driving the print units 600.

At the reverse printing station 610 print heads 611 and 611a are mounted diametrically opposite from each other, FIG. 11. A narrow roller 700, FIG. 13a, is mounted on the shaft 19 to feed the card through the print station in cooperation with the platen roll 670. The hub 710 of the roll 700 has a dove tail 711 fitting into a mating dove tail 712 on a block 713 attached to the shaft 19. The block 713 carries blocks 612 and 612a for mounting the print heads 611 and 611a. Hence the position of the print heads 611 and 611a are always located laterally in a fixed position with respect to the roller 700. The importance of this will be seen in the description of the mechanism for indexing the print heads 611 and 611a described in detail hereinafter.

Essentially the indexing mechanism 605 indexes the print heads 611 and 611a through indexing fingers 615 movable into and out of the path of rollers 614 carried on indexing arms 613. Each indexing finger 615 is fixed to a bushing 714 which is mounted on the shafts 617a, 617b, 617c and 617d, for rotating the index fingers 615. The bushing 714 has a groove 715 to locate the roller 700; hence the indexing finger 615 will always be properly located with respect to the roller 614 on the indexing arm 613.

Ink is applied to the print heads by means of an inking unit 740, FIGS. 13 and 2a, which comprise an inking roller 750, an inking transfer roller 751, an ink supply roller 752, and an inking unit support bar 753. The inking roller 750 is mounted on a shaft 754 journalled in side plate members 755 of the inking unit. The side plate members 755 are fixed to a front plate 756 which has a shoulder portion 757 to fit onto the edge of the support bar 753 when the inking unit 740 is mounted thereon. The inking unit 740 is secured onto the support bar 753 by means of a spring clip 758. This arrangement allows the inking unit 740 to be positioned anywhere along the length of the support bar 753 by merely releasing the spring clip and sliding the inking unit 740 to the desired position. Ink for the inking unit 740 is contained in a reservoir 759 between a doctor blade 760 fixed on one end to the front plate 756 and with its other end bearing on the ink supply roller 752 mounted on a shaft 752a journalled in the side plate members 755. The doctor blade 760 being of the conventional type is held against the peripheral surface of the ink supply roller 752 by screws 761 threaded through the front plate 756 to bear against the doctor blade 760 and thereby providing a means for adjusting the pressure that the doctor blade 760 exerts against the ink supply roller 752. The ink supply roller 752 rotates to receive ink from the reservoir 759 and is driven by a ratchet drive 762 consisting of a ratchet wheel 763 fixed to the end of the shaft 752a extending through one of the side plates 755. The ratchet wheel 763 is driven by a dog 764 pivotally attached to one arm 765 of a pair of arms 765, each pivotally mounted at one end on the ends of a shaft 766 journalled in the side plate members 755 and extending therethrough. The other end of the arm 765 mounting the dog 764 carries a cam follower 767 caused to follow a cam 769 fixed to the cam shaft 27 by means of a torsion spring 768. As the cam shaft 27 rotates, the cam 769 will move the cam follower 767, thereby causing the arms 765 to pivot about the shaft 766 thereby actuating the dog 764 to advance the ratchet wheel 763 to rotate the ink supply roller 752. The transfer roller 751 fixed on a shaft 751a on each end in brackets 770 fixed to resilient links 770b extending from collars 771 fixed on the arms 765 is frictionally driven as it first contacts the ink supply roller 752 and then contacts the ink roller 750 as the arms 765 pivot, hence transferring ink from the supply roller 752 to the ink roller 750.

*Indexing Mechanism for Card Printer*

As previously stated, there are two printing stations 610 and 620, respectively, FIG. 11, for printing serial numbers, the printing units 600 at station 610 print on the reverse side of a card, while the print units 600 at station 620 print on the obverse side. Since serial numbers are being printed, it is necessary to index the printing units 600 for each card through the machine. As stated above, at each print station there are two print heads diametrically opposite each other. At station 610 print heads 611 and 611a, FIGS. 11 and 13a, are shown as standard rotary print heads, while at station 620 print heads 616 and 616a are of the barrel head type. The print heads turn one-half revolution per card cycle; hence only one print head is in the printing position during a card cycle. An indexing mechanism 605, FIG. 11, is provided to index the print head not in the printing position. Hence one print head prints odd numbers, while the other prints even numbers; however, in the absence of a card, mechanism is provided to switch the order of the print heads so that the head which had been printing odd numbers would switch to print even numbers and the head which had been printing even numbers would change to print odd numbers. The switching of print heads from odd to even numbers and vice versa is necessary in order to keep the serial numbers in correct order. For example, both print heads are initially set to the same number. One of the print heads will be in position to print that number when a card passes through the machine. The other print head will pass the indexing mechanism to be indexed once and then come into position to print on the next card passing through the machine. The print head which printed the number on the first card now passes the indexing mechanism to be indexed twice to print on the third card being processed and the print head which had printed on the second card will be indexed twice to print on the fourth card. Hence after the initial printing, each print head is indexed twice, provided there are not any skip feeds.

In the event of a skip feed, the print head set up to print on the skipped card passes through the printing position without printing and the other print head which comes into the indexing zone at this time is indexed only once. After the print head set up to print on the skipped card passes through the printing position, it comes to the indexing zone to be indexed once; therefore, no numbers are skipped and each card printed will be in serial order.

For greater clarity, FIG. 22, assume the print heads are (a) and (b) and both are initially set up to print the number one. Cards are now fed through the machine, and the first card is printed upon by one of the print heads. One print head will be in the print zone, and the other will be in the indexing zone. If (a) is in the print zone, it will print the number one on the first card; print head (b) will be indexed once to be set to the numeral two, and as it moves to the printing position, it prints the number two on the second card, while print head (a) is indexed twice to the numeral three. Print head (a) then passes to the printing position to print the number three on the third card and print head (b) is indexed twice to the numeral four. Subsequent to the indexing of the print head (b) to the numeral four, it comes into the printing position; however, assume the fourth card is absent. The absence of the fourth card is detected and print head (a) is indexed only once to the numeral four and as it passes into the printing position, it prints the number four on the fourth card through the machine. Print head (b) is also indexed only once during the printing of the fourth card to the numeral five to print on the fifth card; hence it is seen that print head (a) which started out printing odd numbers switched to print even numbers when a skip feed occurred. If another skip feed succeeding the fourth machine cycle would have occurred, print head (b) would not be indexed but would still have the numeral four, and indexing of either print head would not take place until a card comes into the printing position at which time the print head not in the printing position would be indexed once.

Referring to FIG. 11 when the print heads 611, 611a, 616 and 616a are to be indexed, indexing fingers 615 on shafts 617a, 617b, 617c and 617d, respectively, are moved to a position to interfere in the path of the rollers 614 on the arms 613, thereby causing the arms 613 to pivot and consequently cause the print heads to index one position each time the rollers are cammed under the index fingers 615. From the foregoing it is seen that it is quite important to have the proper number of indexing fingers 615 in the path of the rollers 614 so that the print heads 611, 611a, 616, and 616a will always be properly indexed to print the correct serial number. The shafts 617a, 617b, 617c, and 617d are rotated or rocked through an arc to bring the indexing fingers 615 in the path of the rollers 614 by a cam and linkage arrangement.

An arm 619, FIG. 5, having a cam surface 619a is pivotally mounted on one end by a pin 621 fixed to the arm 619 and journalled in the frame member 10 in a position to be acted upon by two diametrically opposed rollers 618 rotatably mounted on the face of the gear 28. A pin 622 fixed on the other end of the arm 619 is arranged to fit in a U-shaped slot 623 terminating in one end of an arm 624 fixed to the shaft 617c at its other end. Another arm 625 having a cam surface 626 is pivotally mounted on one end by a pin 627 fixed to the arm 625 and journalled in the frame member 10 in a position to be acted upon by the rollers 618 being carried by the gear 28 after one of the rollers 618 has passed the cam surface 619a on the arm 619. A pin 628 is fixed to the other end of the arm 625 to extend therefrom to fit in a U-shaped slot 629 terminating in one end of an arm 630 fixed to the shaft 617d at its other end. Hence, as the rollers 618 on the gear 28 pass the cam surfaces 619a and 626, the arms are lifted, thereby rocking the shafts 617c and 617d through the pins 622 and 628 and the arms 624 and 630, respectively. As the shafts 617c and 617d are rocked in the manner indicated, shafts 617a and 617b are also rocked by means of a link 631 and a link 634. The link 631 is connected on one end to an arm 632 fixed to the shaft 617d; on its other end to an arm 633 fixed to the shaft 617a. The link 634 is connected on one end to an arm 635 on shaft 617c and on its other end to an arm 636 on shaft 617b. A spring 637 connected on one end to the arm 632 and on its other end to the arm 635 constantly urges the arms 632 and 635 to resist rotation of the shafts 617d and 617c, respectively, and also restores the arms 619 and 625 to be in the path of the rollers 618.

A latch mechanism is utilized to lock the shafts 617a, 617b, 617c, and 617d in position to hold the indexing fingers 615 in the path of the rollers 614 on the print heads 611, 611a, 616, and 616a. The latch mechanism comprises a series of card sensing fingers 640 fixedly attached in a spaced relation to a bail plate 641 to extend from the edge 642 thereof. The bail plate 641 has a pin 643 on each end which extends through bearing blocks, not shown, to be journalled therein and which are fixed to card guide 644. A Y-shaped arm 645 is fixed to the portion of the pin 643 extending through the bearing block. A spring 646 fixed to the end 647 of the arm 645 and to a pin, not shown, urges the card sensing fingers 640 against an inclined surface 648 of the card guide 644. A link 649 has an up-turned end 650 to fit in a hole 651 of the arm 645. The other end of the link 649 is offset from the main portion of the link by a right angle bend 652 which is disposed to lie in a slot 653 of an arm 654 freely mounted on the shaft 617b.

A card fed by the cooperating feed rollers 217 and 221 to the print station engages the sensing fingers 640 to pivot them about the center of the pins 643, thereby pivoting the arm 645 to move the link 649 in the slot 653. A spring 655 fixed to the arm 654 and a pin, not shown, causes the arm 654 to follow the movement of the link 649. At this time, the exact timing will be indicated later herein, the arm 633 on shaft 617a is rocked in a manner that a flange 657 on the arm 654 is allowed to pass under a hook 657 fixed to the arm 633, thereby preventing the arm 633 to return to its position prior to the shaft 617a being rocked. The arm 632 on shaft 617d which caused the shaft 617a to rock by means of the link 631 is also prevented to return to its unrocked position under the action of the spring 637, since the arm 633 is latched by arm 654. Hence index fingers 615 on shafts 617a and 617d are held in position to interfere with the rollers 614 to index once the print heads not in the printing position. Shaft 617 had been rocked prior to the rocking of shaft 617d; however, an arm 658 freely mounted on the shaft 617d was not in position to hold the shaft 617c through the arm 635 in the rocked position and consequently spring 637 restored the shaft 617c to its unrocked position. After the first card had passed through the printing station 610 the arm 654 prevents the arm 633 from returning by action of the spring 637. Furthermore, as the shaft 617d rocked, a spring 659 fixed to the shaft 617d engaged the flange 660 on the arm 658 to move the arm 658 in position for the hook 661 fixed to the arm 635 to lock over the flange 662 on the arm 658. Accordingly, on the next card through the machine, the spring 659 being held in position to hold the flange 662 in position to latch under the hook 661, since shaft 617d is locked in the rocked position, the arm 635 is prevented from returning under action of spring 637 after the shaft 617c is rocked. Hence indexing fingers 615 on the shafts 617b and 617c are held in position to interfere with the rollers 614 and the print heads not in the printing position will be indexed once by the index fingers on shafts 617a and 617d and once by the index fingers on shafts 617b and 617c. As cards are continually fed through the machine, the index fingers 615 are held in position by the latch mechanism to interfere with the rollers 614. The only motion involved under the latched condition is the winking of the latch points every card cycle.

Whenever a skip feed occurs, the card sensing fingers 640 are returned to their position against the inclined surface 648 by the action of spring 646. The flange 656 on arm 654 is moved out of interference with the arm 633 by action of the link 649 which is moved as the sensing fingers 640 move to the position against the inclined surface 648, at this time shaft 617a was rocked, thereby moving arm 633 to allow the flange 656 to move out from under the hook 657. Three degrees of clearance is provided for this action; in other words, spring 655 restores the arm 654 three degrees before the flange 656 is able to interfere with the hook 657. Hence the indexing finger 615 on shaft 617a will be rotated to a position so as not to interfere with the rollers 614 and consequently will not index the print heads 611 and 611a. In the timing of the indexing mechanism the shafts 617c and 617b are rocked at 126° of a card cycle and shafts 617d and 617a are rocked at 206°. A card engages the card sensing fingers 640 at 200° in the cycle and continues to bear against them until 350° of the card cycle. If skip feeds occur in succession, the indexing fingers 615 on shafts 617d and 617a will remain out of the path of rollers 614 and the indexing fingers 615 on shafts 617c and 617b will be moved out of the path of the rollers 614, since shafts 617d and 617a were allowed to restore by action of the spring 637 and the spring 659 was rotated to bear against the flange 663 on the arm 658. However, since at that time the hook 661 prevented the arm 658 from being moved, the spring 659 just exerts pressure on the flange 663 until the hook 661 releases the arm 658. The hook 661 releases the arm 658 on the subsequent cycle at 126° time of the cycle. Relating the timing to the index operation, it is seen that shafts 617c and 617b rock at 126°, and as previously stated, the shafts 617c and 617b will not be prevented from returning by action of the spring 637. As the card cycle continues, a card engages the sensing fingers 640 at 200° to allow the arm 654 to start moving under the action of spring 655 and at 206° the shafts 617d and 617a are rocked; however, since the arm 654 is interfering with the arm 653, the arm 653 cannot be restored by the spring 637. The spring 659 has been moved as the shaft 617d rocks to move the arm 658 into an interfering position with arm 635. Hence, during the next card cycle at 126°, the arm 635 wipes past the flange 662 to flex the spring 659 and as the spring 637 attempts to restore the arm 635, the hook 661 latches over the flange 662. The same timing is employed for unlatching the arms 633 and 654 and arms 635 and 658 to allow the spring 635 to restore the shafts 617a, 617b, 617c and 617d to the unrocked position.

In the event of a skip feed, mechanism has been provided to move the printing platens 670 and 671 out of position so that the print heads will not print on the platens, FIGS. 5, 11 and 12. The platens 670 and 671 are identical; hence only one of the platens will be described in detail. Platen 671 comprises a resilient coating of rubber 672 over a steel tube 673. A gear 674 is pressed into one end of the tube 673 and has a recessed portion 675 to contain a ball bearing 676. The other end of the tube 673 does not carry a gear but does have a ball bearing 676 pressed therein. A shaft 677 extending through the tube 673 and journalling the ball bearings 676 is journalled in the frame members 10 and 20 by sleeve bearings 678 and extends beyond the frame member 10. The portion of the shaft 677 in the sleeve bearings 678 is of a reduced diameter to that portion of the shaft 677 in the ball bearings 676 and further the center of the reduced portion of the shaft 677 is eccentric to the center of the portion of the shaft 677 in the ball bearings 676. Therefore, if the reduced portion of shaft 677 is caused to rock, it will move the platens toward and away from the centers of the shafts 19 and 29 which carry the print heads. To provide an adjustment for increasing the printing pressure, the sleeve bearings 678 are contained in bushings which are mounted eccentrically in the frame members 10 and 20 so that rotation of the bushings will move the center of the platen in the desired direction either to increase or reduce the printing pressure. The mechanism for rocking the reduced portion of shafts 677 and 677a consists of an arm 679, FIGS. 5 and 11, fixed to the end of the shaft 677 extending beyond the frame member 10 and an arm 680 fixed to the end of the shaft 677a. The arm 679 has a pin 681 fixed thereto in a position to lie in a slot 682 contained in one end of the arm 680. The arm 680 is biased by a spring 683 to normally hold the platens out of printing position. A flange 684 is formed on the other end of arm 680 and normally lies in a slot 685 in the end of an arm 686 pivotally mounted on a stud shaft 687 fixed in the frame member 10. The portion of the arm 686 about the stud shaft 687 forms a bushing 688 and a spring link or wire 689 is fixed on one end to the bushing 688 and on its other end to a pin 645a extending from the arm 645. The arm 679 has a cam surface 690 and is so positioned that as the gear 28 rotates, the rollers 618 will cam the arm 679 to rock the shaft 667 and also shaft 667a through the pin 681 acting on the arm 680 through the slot 682, thereby causing the platens 670 and 671 to move toward the printing position ready for printing. If a card is not present at this time, the platens will be restored to the nonprint position by the spring 683. However, if a card is present, the arm 686 would have been rotated by action of the card sensing finger 640 through the link 689 to prevent the restoring of the platens to a nonprint position. A reduced portion 691 on the end of arm 686 engages the flange 684 as the arm 680 is rotated. The timing of this operation is such that the card sensing finger 640 would be engaged by a card, if present, before the roller 618 engages the cam surface 690. However, the flange 684 prevents the arm 686 from being rotated by the sensing finger 640 through the link or wire 689, the link or wire 689 being resilient just flexes under the pressure exerted by the sensing finger 640 until the flange 684 is moved out of the slot 685, then the arm 686 is allowed to rotate to bring the recessed portion 691 in front of the flange 684 to prevent the arm 680 from restoring under the action of the spring 683. Furthermore, since the link or wire 689 is resilient, it will allow the sensing finger 640 to restore first after a card passes, even though the flange 684 is bearing against the recessed portion 691.

*Card Scoring and Creasing Mechanism*

The mechanism for performing rotary scoring and creasing is located at a station 800 between the obverse printing station 620 and the stacking station 900, FIGS. 1b and 1c. The principles involved in this operation are fundamental to any type of scoring desired or in other words, the number and configuration of scores or creases made does not require any change in principle of operation. Generally, FIGS. 14, 15 and 16, the scoring mechanism comprises a common metallic anvil roller 801 fixed to a shaft 802 journalled in the frame members 10 and 20 by bearings 803.

The anvil roller 801 serves as a backing roller for cooperating with scoring units 804 to perform the scoring. One end of the shaft 802 extends through the frame member 20 and carries the gear 56 meshing with a gear 53 on the shaft 902 driven as afore-described. The anvil roller 801 having a peripheral speed equal to card speed feeds cards through the scoring station in cooperation with feed rollers 807 supported by and positionable along the support bar 808, also serving as a support for the scoring units 804. The support bar 808 fixed between the frame members 10 and 20 has a V-shaped tongue 809 running the length of the bar with the apex of the V directed toward the center of the anvil roller 801. The scoring units 804 and feed roller units 807 are carried in a U-shaped frame member 810 which has V-shaped grooves 811 in the projections 812 of the legs 813 of the U-shaped frame 810 corresponding to the V-shaped tongue 809 so that V-shaped tongue 809 will fit into the V-shaped grooves 811. The mounting of the scoring units 804 and feed roller units 807 onto the support bar is in a manner that the mating point of the V tongue 809 and the V groove 811 form a pivot point for the units. A flat spring 814 is loosely riveted to the base 815 of the U-shaped frame 810 to extend under the tip 816 of a pressure adjusting screw 817 threaded through a nut 818 fixed to the base so that the center line of the screw registers with the pivot point of the tongue 809 and the groove 811. The spring 814 is offset to form a leg 814a having an angularly up-turned end 814b which rests upon the support bar 808, thereby urging the unit to pivot toward the anvil roller 801 about the pivot point of the tongue 809 and the groove 811. A finger 819 riveted to the spring 814 provides a grip for releasing spring pressure to facilitate removal of the units by gripping the finger 819 and the adjusting screw 817 and squeezing them toward each other. This support arrangement provides for easy removal of the score and feed roller units 804 and 807, respectively, as well as adjustment of the units along the support bar 809. The feed rollers 807 and the scoring wheels 821, FIG. 16, are carried on a bearing 822 supported by a shaft 823 fixed between the legs 813 of the U-shaped frame 810.

In order to increase the life of the anvil roller 801, the scoring units 804 are moved out of contact with the anvil roller 801 during the portion of the machine cycle between cards. The U-shaped frame 810 has an extending nose portion 813a, FIG. 14, adapted to lie within a groove 824 in a rock shaft 825 journalled in the frame members 10 and 20; hence, as the rock shaft 825 is rotated, the scoring units 804 are lifted off of the anvil roller 801. The mechanism for rotating the rock shaft 825, FIG. 15, includes an arm 826 with a slot 827 fixed to the end 828 of the rock shaft 825 extending through the frame member 20. The slot 827 is located at the end of the arm 826 to receive a pin 829 fixed to one end of an arm 830 supported about a stud shaft 837. The arm 830 is biased by a spring 831 so that a cam follower 832 attached to the arm 830 on a pin 833 is urged to follow a cam 834 fixed by screws 835 to the gear 53 on the shaft 902 which rotates one revolution per card cycle. The screws 835 extend through slots 836 in the cam 834 to thread into the gear 53. The slots 836 facilitate adjustment of the position of the cam 834 and thereby adjusting the period that the scoring unit 804 will be lifted from the anvil roller 801 as the arm 830 rocks the shaft 825 through the pin 829 and the arm 826.

*Card Counter and Stacker*

A combined card counter and card stacker is provided at a card counting and stacking station 900 to count and stack an exact number of cards. Upon being stacked, the cards are moved by a conveyor 990 for packaging. The cards may be stacked in decks of fifty, one hundred, two hundred or five hundred. Since the cards processed may vary in size and therefore vary in weight, a gravity type stacker unit is not suitable; consequently, the stacker is positively driven as the cards are being stacked.

In general, a card counter shaft 902, FIG. 17, revolving one revolution per card cycle drives a card counter 900a, FIG. 15a, through an appropriate cam and linkage arrangement to advance the counter 900a, one digit at a time, and if the card is skipped, the counter 900a will not be advanced. The motion derived in advancement of the counter is utilized to drive a shaft 927, FIG. 19, for lowering and raising a card elevator 926 by a cam, linkage, and gear arrangement. As the elevator 926 lowers, cards stack upon it, and when a predetermined number of cards have been stacked, the elevator 926 deposits the cards onto the conveyor 990 which moves the cards away from the elevator 926. While the elevator is depositing the cards onto the conveyor 990, a pair of shutter plates 958 and 959 move into a position to assume the function of the elevator 926, and after the elevator 926 has deposited the cards onto the conveyor 990, it is raised to receive the cards to form the next stack which are collecting in the interim on the shutter plates 958 and 959, and as it does so, it causes the shutter plates 958 and 959 to return to their initial position. The conveyor 990 is driven from the same shaft 927 which drives the elevator 926. When the requisite number of cards have formed a stack, the shaft 927 driving the elevator is clutched to a gear train 950 which drives the elevator 926 at a faster speed to deposit the cards on the conveyor 990 and returns the elevator 926 to receive the cards stacking on the shutter plates 958 and 959. The timing of each action is shown in the diagram of FIG. 21. Although the elevator 926 would be in position to receive the first cards through the machine, the shutter plates 958 and 959 are set so that the first cards through the machine would be stacked on the shutter plates, since this would be the operation for all decks successive to the first deck stacked.

Now since the smallest deck to be stacked is fifty cards, approximately forty-five cards will be allowed to stack on the shutter plates 958 and 959 before the elevator takes over. Hence, five more cards would be stacked on the elevator 926 and then the shutter plates 958 and 959 would move into position again to stack the cards, and during this time, the elevator 926 lowers rapidly to deposit the cards onto the conveyor 990, the conveyor 990 transports the cards from the elevator 926, the elevator 926 then rises rapidly and arrives to receive the cards from the shutters 958 and 959 when approximately forty-five cards have been again stacked on the shutters. Obviously, since there is ample time for the elevator to return to receive cards from the shutters before the desk of fifty has been completed, there is sufficient return time of the elevator for the larger decks.

Referring to FIGS. 17, 17a, 18 and 19 for specific details, a cam 901 fixed to the shaft 902 is disposed to actuate a cam follower 903 carried by an arm 904 pivotally mounted on a stud shaft 905 fixed in the frame member 20. The cam follower 903 is held in contact with the cam 901 by means of a spring 831. One end of the arm 904 has a slot 906 to receive a pin 907 fixed to a ratchet dog carrier 908 journalled on a pin 20b extending outwardly from a bracket 20a fixed to the frame member 20 by screws 20c. The ratchet dog carrier pivotally mounts a three step dog 909 on a pin 910. The dog 909 is held by a torsion spring 912 in engagement with ratchet wheels 911 of the counter 900a, FIG. 17a, which comprises a units wheel 911a, a tens wheel 911b, and a hundreds wheel 911c. Complementary sight wheels 911a', 911b' and 911c' are fixed to the ratchet wheels 911a, 911b and 911c respectively. Each ratchet wheel has ten teeth, the tenth tooth is deeper than the others, thereby providing for a carry-over from the units to the tens and from the tens to the hundreds position in a well-known manner for deep tooth ratchet counters. The ratchet wheels 911 are detented by a detent 20d fixed to the bracket 20a. Action of the cam 901 on the cam follower 903 causes the arm 904 to pivot, thereby moving the ratchet dog carrier 908 and in turn advancing the counter 900a one digit through movement of the dog 909.

As previously stated, if a card is skipped, the counter 900a will not be advanced. Essentially, the presence or absence of a card is detected just prior to the position of the feed rollers 228 and 228a for feeding a card to the stacker 900, FIG. 17, and if a card is present, the counter 900a will be allowed to advance one digit; otherwise, it will not be advanced. The latch arrangement for controlling the advancement of the counter 900a comprises a series of card sensing fingers 913, FIGS. 14 and 17, fixed along the length of a shaft 914 journalled in bearing supports 913a fixed to the support bar 808. An arm 916 fixed to the end of the shaft 914 is held in contact with an arm 917 of a dog latch 918 fixed to a pin 919 journalled in the frame member 20 by means of a spring 920 attached to a projection 921 on the arm 916 and to a pin 922 on the dog latch. The effective lever arm from the projection 921 to the center of the shaft 914 is greater than the effective lever arm from the pin 922 to the center of the pin 919, and therefore, the card sensing fingers 913 are normally biased by the spring 917 against the inclined surface 923 of the support bar 808, and the latch dog 918 is held in the latched position with the tail 924 of the latch dog 918 in contact with a recessed portion 925 in the extension 908a of the ratchet dog carrier 908. When a card engages the sensing fingers 913, the fingers 913 are rotated by the card, and thereby rotating the latch dog 918 from the latched position to allow the ratchet dog carrier 908 to be moved by the arm 904 through the cam follower 903 as the cam 901 rotates and thereby advance the counter 900a one digit through the dog 909.

The counted card as it passed the sensing fingers 913 enters the feed rollers 228 and 228a to be fed onto the elevator 926, FIG. 18, upon which the cards stack.

As the card leaves the feed rollers 228 and 228a to stack upon the elevator 926, it strikes resilient stop members 1010 attached at predetermined intervals to a spreader bar 1011, FIGS. 3 and 18, fixed between stacker frame members 950a and 950b. The stop member 1010 is made resilient to function as a card patter and thereby cause the cards to stack evenly. When an oncoming card strikes the stop member 1010, it causes the stop member to oscillate and thereby jostle the cards against a back plate 1012 slotted at its top end to permit passage of the shutter plate 959.

The cards, as they stack, are also jostled endwise. A cam 1013, FIG. 3a, is fixed on the shaft 229a near the frame member 10 to be in contact with a cam follower 1014 fixed to a block 1015 mounted on a transverse rod 1016 journalled in frame members 950a and 950b. The cam 1013 rotates with the shaft 229a and the transverse rod 1016 is caused to move back and forth sideways as the cam follower follows the cam by action of a compression spring 1017 disposed between the block and the stacker frame member 950b. A patter finger 1018 is fixed to depend from a block 1019 of a two-piece clamp 1020 having the facility to clamp onto the transverse rod 1016 anywhere along the length thereof to move therewith or to clamp onto a transverse rod 1021 parallel to the transverse rod 1016 and fixed in the stacker frame members 950a and 950b. To jostle the cards sideways as they stack upon the elevator 926 or the shutters 958 and 959, two patter fingers are used. One of the patter fingers 1018 is attached to the fixed transverse rod 1021 to align with one side-edge of a card passing through the machine while the other patter finger 1018 is attached to the movable transverse rod 1016 so that upon movement thereof the cards are jostled against the fixed patter finger 1017. The two-piece clamp 1020 is made to attach onto either the fixed transverse rod 1021 or the movable transverse rod 1016 by a plate 1022 which cooperates with the block 1019 to clamp onto either of the transverse rods 1016 or 1021 by means of a bolt 1023. The elevator 926 is driven from a shaft 927 carrying a cam 928. The shaft 927 revolves one revolution per forty-five card cycles and as previously stated, the shaft 927 is driven by a cam and linkage arrangement as the cards are being stacked, and after the exact number of cards have been stacked, the shaft 927 is clutched into a faster drive for further lowering of the elevator 926 to deposit the cards onto the card conveyor 990 and raising the elevator to receive the cards stacking upon the shutters 958 and 959. When the elevator 926 is being lowered as the cards are stacking upon it, the shaft 927 is driven from a spiral-shaped cam 929, FIG. 19, fixed to the units wheel 911a of the card counter 900a. The cam 929 which makes one revolution for every ten cards entering the stacker operates an arm 930 journalled on the shaft 927 and pivotally carrying a cam follower 931 on a pin 932 and held against the cam 929 by means of a spring 933 attached to a pin 934 on the arm and a pin 935 on the frame member 20. The arm 930 also carries a sprag 936 on a pin 937, the sprag 936 is biased by a spring 938 to engage a semicircular disc 939 fixed to the shaft 927. Hence as the units wheel 911a is advanced by means of the dog 909, the cam 929 operates the arm 930 to rotate the shaft 927 by means of the sprag 936. A sprag 940 mounted on a pin 941 fixed in the frame member 20 is biased by a spring 942 to detent the disc 939 in a manner to prevent rotation of the disc 939 in a direction opposite to advancement of the disc by the sprag 936. The cam 928 is disposed along the shaft 927 to be engaged with a cam follower 943 attached to an S-shaped arm 944 pivotally mounted on one end to a shaft 945. The other end of the arm 944 is pivotally connected to a link 946 which rotatably carries a gear 947 disposed between a rack 948 fixed to the stacker frame member 950a and a rack 949 fixed to the elevator 926.

The stacker frame member 950a on the right-hand side of the stacker 900 when viewing the machine from the front and a like stacker frame member 950b on the left-hand side are pivotally mounted on pins 950c and 950d fixed in brackets 950e and 950f fixed to the frame members 20 and 10 respectively. Accordingly, as the shaft rotates, the elevator 926 moves in accordance with the period of the cam 928 through the link 946 and the gear 947 and racks 948 and 949 arrangement. Identical structure of the S-shaped arm 944, the link 946, the gear 947 and the racks 948 and 949 is provided to maintain the elevator on a level condition as it moves in a pair of guides 950g and 950h, FIG. 3. It will be remembered that the elevator 926 has a particular rate of motion as the cards are stacking upon it and a faster rate of motion after the desired number of cards have been stacked. The elevator 926 is driven at this faster rate by means of the drive arrangement 950, FIG. 17, consisting of the gear 61 fixed to the shaft 19 in a manner to be in mesh with a gear 951 on the shaft 62. Concentric on the shaft 62 is a gear 952 which is in mesh with a gear 953 fixed to the shaft 63 also having fixed thereon a gear 954 in mesh with a gear 955 fixed to the shaft 64. A gear 956 fixed to the shaft 64 is in mesh with a gear 957 journalled on the shaft 927. The gear arrangement 950 is constantly running while the machine is running. However, it will not be connected to drive the shaft 927 until the desired number of cards have been stacked, and the shutters 958 and 959 have been moved into position to stack the oncoming cards. The tens and hundreds sight wheels 911b' and 911c', respectively, have suitably positioned holes 960 to manually receive pins 961 according to the number of cards desired to be stacked. The pins 961, while positioned in the desired holes 960, rotate with the ratchet wheels 911b and 911c to strike ears 962, depending from flange 963 on a lever 964. The lever 964 pivotally mounted on a stud shaft 965 fixed in the frame member 950a is biased by a spring 966 attached to a pin 967 on the lever 964 and a pin 968 on a lever 969 to hold a recessed portion 970 of the lever 964 in contact with a flange member 971 on the lever 969. The lever 969 is fixed to a shaft 972 which also carries the shutter plate 958. Hence the pin 961 strikes the ear 962 as the ratchet wheels 911b or 911c rotate a predetermined amount, the arm 964 is rotated to unlatch from the flange member 971 on the lever 969 to allow the lever 969 to be rotated under action of the spring 966 and the weight of the shutter plate 958, thereby bringing the shutter plate 958 into position to stack the cards. During rotation of the lever 969 and the shutter plate 958, the flange 971 engages the lever 964 at a point 973 to move it further in the same direction that the pins 961 were moving it so as to unlatch the shutter plate 959 to allow it to move by action of spring 974 into position to stack the cards in cooperation with the shutter plate 958. The arm 964 has a flange member 975 which latches with a flange portion 976 of a T-shaped lever 977 pivotally mounted on a stud 978 fixed in the frame members 950a. The shutter plate 959 attached to the T-shaped lever 977 is normally prevented by the flange 975 from being urged by the spring 974 connected to the lever 977 and a pin 979 into position to stack the cards. It is seen from the foregoing that the shutter plate 959 moves into position to stack the cards shortly after the shutter plate 958 had been moved into position; hence allowing the tail portion of the card being stacked to settle down, thereby preventing the shutter plates from coming under different cards.

When the lever 969 was unlatched from the lever 964, a link 980 attached to the lever 969 and an arm 981 of a lever 982 caused the lever 982 to rotate about a shaft 983. The lever 982 has a cam surface 984 in contact with a cam follower 985 carried on the end of an arm 986 supported to pivot about a stud pin 987 fixed to the disc 939. The other end of the arm 986 forms a dog 988 shaped to fit in a toothed wheel 989 attached to the gear 957. Thus when the desired number of cards have been stacked, the shutters 958 and 959 move into position to stack the cards to comprise the succeeding deck, the shaft 927 which had been driving the elevator is clutched to be driven by the drive 950 since movement of the lever 964 by the pins 961 causes unlatching of the lever 969, thereby moving the link 980 to rotate the lever 982 about the shaft 983 to allow the arm 986 to pivot about the pin 987 so that the dog 988 engages a tooth on the wheel 989. It is therefore seen that the elevator 926 is lowered by the faster drive after the exact number of cards desired have been stacked. The elevator 926 being constructed in a manner that it may be lowered between belts 991 on the conveyor 990 deposits the cards on the conveyor 990. The conveyor 990 is driven from a gear 992 fixed to the shaft 927, FIG. 18. The gear 992 is in mesh with an intermediate gear 993 journalled on a stud 994 to be in mesh with a gear 995 carried on a shaft 996 carrying rollers 997 for the conveyor 990 which comprises a series of belts 991 running around the roller 997 and corresponding rollers 997a journalled on studs 996a. The gear 992 is semicircular so that the conveyor 990 will be driven after the elevator 926 has deposited the cards on the conveyor 990. A lock wheel 998, FIG. 18, carried on the shaft 927 in a position to engage a cooperating lock wheel 999 fixed to the gear 993 prevents the conveyor 990 from being driven as the cam 928 raises the elevator 926. As the elevator 926 ascends, the portion 1000 of the rack 949 engages the tail 1001 of lever 1002 to pivot it about a stud 1003. The lever 1002 has a slot 1004 to receive a pin 1005 carried on a lever 1006 mounted on the stud 972. The shutter 958 carried by the lever 1006 is moved from under the cards as the lever 1002 pivots. A block 1007 fixed to the rack 949 to ascend therewith causes the shutter plate 959 to move from under the cards as it strikes a pin 1008 fixed to the arm 977 carrying the shutter 959 to rotate the arm 977 about the shaft 978. The elevator 926 overrides in the upward direction and drops slightly after latching shutters 958 and 959 to allow the shutters freedom to be released when a deck of fifty cards are stacked, since the shutters move quite quickly back into position to stack the cards. Of course when the shutters are latched, the lever 969 is rotated to move the link 980, which moves the lever 982, thereby camming the dog 988 out of the tooth in the wheel 989 and consequently disconnecting the shaft 927 from the faster drive 950. As previously stated, that since the elecator moves up to take the cards from the conveyor at all times subsequently to the initial stack, it is just as well to allow the cards to stack on the shutter initially. The shutters 958 and 959 may be moved into stacking position before the machine is started by manually operating lever 964 to unlatch the lever 969 and arm 977 to permit the springs 966 and 974 to move the shutters 958 and 959 into stacking position.

To insure proper stacking operation a hand crank 63a journalled on the stud shaft 63 is provided to reset the cam shaft 927 to a home position or in other words position the elevator 926 to start from a home position. The hand crank 63a carries a retractable pin 63b normally spring biased to be disposed in a hole in the gear 953 when aligned therewith. Hence by retracting the pin 63b the hand crank 63a can be turned to rotate the gear 954 without being engaged with the entire gear drive 1 of the machine to rotate the cam shaft 927 through the gearing afore-described.

Electrical Circuit and Timing

Essentially, a circuit is provided from a power supply to the motor M through a relay and relay points and hopper contacts and jam contacts so that the circuit will be interrupted if a card is fed from the hopper crooked, if the hopper empties or if a card jams in the machine. Referring to FIG. 23, power is supplied to a line switch LS and from the positive side of the line switch LS through a fuse F to one side of a relay R1 and from the other side of the relay R1 to one side of a normally open start key SK, the other side of the start key SK is connected through a fuse F to the negative side of the line switch LS. Upon depression of the start key SK, the relay R1 is energized to close relay point R1a to complete a circuit between the relay R1 and the motor M and relay point R1b to complete a circuit from the motor to the negative side of the line switch LS through the fuse F, thereby completing a circuit from the power supply to the motor M. Relay R1 also closes relay point R1c to complete a circuit to one side of a stop key SW, which is normally closed; the other side of the stop key SW is connected to the negative side of the line switch LS through the fuse F. Cards fed from the card hopper 100a close hopper contacts HC which are normally open, thereby completing the circuit to a series of jam contacts JC. At 110° time to 305° time of a card cycle, FIG. 24, the hopper contacts HC are open and a circuit breaker CB1 is in a closed position from 90° time to 325° time to maintain the circuit. Cards which are fed askew from the hopper 100a will not close the hopper contacts HC, while the circuit breaker CB1 is in open position, and therefore, the circuit will be interrupted to stop the machine. The circuit will also be interrupted to stop the machine after a card hopper is emptied, since there will not be any cards to close the hopper contacts HC, while the circuit breaker CB1 is in its open position. The jam contacts JC are located at the print index, the punch index and at the card counter stations. These jam contacts JC are normally closed, and the cards feeding through the machine cause them to open; however, at the time these contacts are being opened by a card which is progressing through the machine in its proper position, the circuit is maintained by circuit breaker CB2 connected in parallel with the jam contacts JC at the print index and circuit breaker CB3 connected in parallel with the jam contacts JC at the punch index and card counter, whereas a card not in its proper position while it is progressing through the machine such as in the case of a card jam will open the contacts JC at the time the circuit breakers CB2 and CB3 are in their open position. Hence the circuit will be interrupted, and the machine will be stopped. Of course, manual stopping of the machine is accomplished by opening the stop switch SW.

Card Movement and Machine Operation

In describing movement of a card through the machine and operation of the machine, the standard card will be the type of card processed. Prior to starting the machine, the machine operator would locate the card hopper 100a, FIGS. 1b and 6, along the bar 101 to the desired position. With the card hopper 100a in the desired position, the throat assembly 110 is arranged in a position to correspond with the position of the card hopper 100a. The guide plates 106 would be set to accommodate a standard card, and the bail 127 would be located in the notch 125 of the block 124 to feed standard cards. The serial punch mechanism would be located along the registration bar 504, FIGS. 1a, 8 and 9, at the first punch station so that serial numbers would be entered into the cards in the desired field and any other punch units for special punching would also be located on the bar 504 at the first punch station as well as at the second punch station. The punch indexing mechanism would be reset so that after the punch indexing mechanism is actuated, the punch will punch the first serial number. The card positioning mechanisms would be mounted on the cross-head slipper plates 305a and 305b in a position to properly position a card for punching. The serial number printing unit for the reverse printing station 610, FIGS. 1b and 11, would be properly positioned along the shaft 19, and the serial number printing unit for the obverse printing station would be properly positioned along the shaft 29, each of the printing units would be set to the number to correspond with the number set up on the serial punch. The scoring mechanism 804, FIGS. 1b, 14 and 16, would be properly positioned along the support bar 808 by gripping the screw head 817 and the finger 819 and squeezing them toward each other to relieve the tension of the spring 814, thereby permitting the scoring unit 804 to be moved along the bar 808. The pin 961, FIG. 19, would be placed in the desired hole in the counter, as for example, in the hole for stacking cards in decks of fifty. The handle 63a, FIG. 17, would be rotated to turn the gear 954 to bring the elevator 926, FIG. 18, to a home position and the lever 964 would be operated to bring the shutter plates 958 and 959 into position to stack the cards.

With the afore-mentioned setups having been made, the machine operator would depress the start key SK, FIG. 23, thereby making a circuit from one side of the line switch LS through key SK to the negative side of the start key SK through the fuse F and from the other side of the start key SK through the relay R1 to the positive side of the line switch LS through the fuse F. With the relay R1 energized, the relay points R1a, R1b and R1c will be closed to complete the circuit to the motor M and to the stop switch SW. The start key SK may be released once the relay points R1a, R1b and R1c close, since then there will be another complete circuit to the relay R1 to maintain it energized. The motor M having been started will start the gear drive 100, thus turning the cam shaft 137 to operate the picker knife 121 which will pick a card from the card hopper 100a at 183° time of the first card cycle, FIG. 20, and advance the card to the first pair of feed rollers 200 and 200a, FIG. 1b, at 240° time. In FIG. 20 two lines are shown in the diagram, one line shows the leading edge of the card and the other shows the trailing edge. As the card continues, it encounters the hopper contacts HC, FIG. 23, at approximately 305° time, some 20° prior to the opening of the circuit breaker CB1; hence if the card is feeding through the machine properly, the circuit will be maintained, since the card will be closing the hopper contacts HC at the proper time. The card leaves the feed rollers 200 and 200a and passes through a card guide 202 to enter the second pair of feed rollers 203 and 203a, FIG. 1b, at 330° time. The card then passes from the feed rollers 203 and 203a between the card sensing finger 481, FIGS. 1a and 9, and card guide 205 at 20° time of the second card cycle. When the card passes between the card sensing finger 481 and card guide 205, FIG. 9, the sensing finger 481 is rotated clockwise about the center of the shaft 478, thereby rotating the arm 473 counterclockwise about the pin 474 to unlatch the flange 476 from the recessed portion 475 and consequently enabling the bail 466 to be moved clockwise about the pin 468 under action of the spring 467a. The clockwise movement of the bail causes the arm 460 to rotate about the pin 463, this movement in turn causes the dog 415 to advance the ratchet wheel 412 one tooth together with the gear 411 which is in mesh to drive the gear 401, thereby bringing the interposer 402 over the next punch 501. Hence the serial punch is set up.

The card enters the third pair of feed rollers 206 and 206a, FIG. 1a, at 70° time of the second card cycle and allows the hopper contacts HC to open at 110° time; however, the circuit breaker CB1 closed at 90° time to maintain the circuit. As the card leaves the third pair of feed rollers 206 and 206a, it is guided to the card positioning mechanism 300, FIG. 8. The gripper head 317 of the card positioning mechanism 300 has been moved away from the base plate 314 to permit the card to enter therebetween. The gripper head 317 closes on the card at 212° and travels at the speed of feed rollers 206 and 206a to position the card against the card stop 327 for punching at the first punch station. The gripper head 317 and base plate 314 overtravel to insure that the card is positioned against the card stop 327 and then dwells for a period of 72° during punch time which occurs at 0° of the third card cycle. The punch die and stripper start their travel at 315.5° of the second card cycle and the punches 501, FIG. 9, clear the card at 47.5° time of the third card cycle. Subsequent to the punching at the first punch station 500a, the card positioning mechanism 300, FIG. 8, moving at feed roller speed moves the card from the first punching station 500a, the direction of travel of the card now being reversed. A second card has been picked from the card hopper at 183° time of the second card cycle and the leading edge of the second card passes the outgoing edge of the first card at 103° time of the third card cycle, while the first card is still held between the gripper head 317 and the base plate 314. The gripper head 317 moves away from the base plate 314 to release the first card at 150.8° time of the third card cycle. The first card has passed between card guide 209 and card guide 210, FIG. 1a, to enter the fourth pair of feed rollers, feed roller 211 cooperating with feed roller 206a, at 148.4° time of the third card cycle. At the time the first card is entering between the feed rollers 206a and 211, the card positioning mechanism 300 is traveling at feed roller speeds; hence there is no pulling on the card. With the gripper head 317 moved away from the base plate 314, the second card enters between the gripper head 317 and the base plate 314, while the card positioning mechanism is dwelling. The second card is gripped at 212° of the third card cycle, and it, like the first card is then positioned against the card stop 327 by the card positioning mechanism now traveling at feed roller speed. The first card continues through the card guides 213 to the fifth pair of feed rollers 214 and 214a which is midway between the first and second punch station. The center of the first card is in the bite of the feed rollers 214 and 214a, FIGS. 1a and 1b, at 0° of the fourth card cycle. The first card is fed from the fifth pair of feed rollers 214 through card guides 216 to the sixth pair of feed rollers 217 and 217a. The card positioning mechanism 300, the gripper head 317 moved away from the base plate 314 to receive the first card at the second punch station 500b, moves at feed roller speed to position the card against the card stop 327 for punching at the second punch station. The gripper head 317 closes against the card at 212° of the fourth card cycle. Again the card positioning mechanism 300 overtravels to insure that the card is against the card stop and then dwells for a period of 72°. Punching at the second punch station 500b occurs at 0° time of the fifth card cycle, the punching action having started at 315.5° time of the fourth card cycle is completed at 47.5° time of the fifth card cycle. The card positioning mechanism 300 moves the card from the second punch station again reversing direction of travel, past card guide 219 and card guide 220, FIG. 1a, to the seventh pair of feed rollers 221 and 217a, and as the first card leaves the second punching station, the leading edge of the second card passes the outgoing edge of the first card at 103° time of the fifth card cycle. The first card continues on from the seventh pair of feed rollers 221 and 217a to pass between the card sensing finger 640, FIG. 1b, and card guide 644 at 200° time of the fifth card cycle and then enters the reverse side printing station 610 at 286° time of the fifth card cycle. The first card passing between the card sensing finger 640 and card guide 644 rotates the card sensing finger 640 counterclockwise moving link 649, FIG. 11, downward to the left, thereby allowing arm 654 to move clockwise under action of the spring 655. The shaft 617d was rocked clockwise at 206° of the fifth card cycle, 6° after the card sensing finger 640 had been rotated by the first card. Rocking of the shaft 617d moves arm 633 to latch the hook 657 over the flange 656 to hold the indexing fingers 615 on shafts 617d and 617a into position to interfere with the rollers 614 on the indexing arms 613. The shaft 617c was rocked at 120° of the fifth card cycle but since the arm 658 was not moved into position by the spring 659 on the shaft 617d to hold the flange 662 under the hook 661 on the arm 635 fixed to the shaft 617c, the shaft 617c was allowed to restore under the action of spring 637. With the card sensing finger 640 rotated counterclockwise, the platen 670 is held in the printing position since the arm 686 has been moved counterclockwise, bringing the recessed portion 691 in front of the flange 684, hence preventing the arm 680 from being restored by the spring 683. The center of the first card passes through the reverse side printing station 610 at 0° time of the sixth card cycle and passes through card guides 223 to enter the obverse side printing station 620 at 67° time of the sixth card cycle. The first card leaves the obverse side printing station 620 at 216° time of the sixth card cycle and passes through card guides 224 to the eighth pair of feed rollers 225 and 225a at 193° time of the sixth card cycle, the first card enters the feed rollers 225 and 225a, FIG. 1b, prior to the card leaving the obverse side printing station. From the eighth pair of feed rollers 225 and 225a, the first card enters the rotary scoring station 800, FIGS. 1b and 14, at 297° time of the sixth card cycle and then passes between the card sensing finger 913, FIG. 1c, and card guide 923 at 19° time of the seventh card cycle. The first card engages the card sensing finger 913 to rotate it clockwise about the pin 914, FIGS. 14 and 17, thereby causing the arm 918 to rotate counterclockwise about the pin 919 to unlatch the flange 924 from the recessed portion 925 of the ratchet dog carrier 908. With the ratchet dog carrier 908 unlatched, the dog 909 is able to advance the ratchet wheel 911a of the counter 900 one step or digit as the cam 901 actuates the cam follower 903 to pivot the arm 904 counterclockwise about the pin 905. The first card continues past the card sensing finger 913 and card guide 923 to enter the ninth pair of feed rollers 928 and 928a, FIG. 1c, at 65° time of the seventh card cycle and leaves the ninth pair of feed rollers 928 and 928a at 215° time of the seventh card cycle to drop onto the shutter plates 958 and 959, FIG. 18, which had been previously set to stack the cards. Cards continue through the machine in the manner afore-described, and as the forty-fifth card is stacking upon the shutter plates 958 and 959, the elevator 926 is ascending to the upper limit of its travel to receive cards from the shutter plates 958 and 959. The top of the rack 1000 strikes the tail 1001 of the arm 1002 to pivot the arm 1002 clockwise about the pin 1003, thereby causing the arm 1006 to pivot counterclockwise about the pin 972 to move the shutter 958 outward from underneath the stacking cards. The elevator 926 continues ascending until the projecting block 1007 on the elevator rack 1000 strikes the pin 1008 fixed to the arm 977 carrying the shutter plate 959, thereby causing the arm 977 to pivot counterclockwise to move the shutter plate 959 from underneath the stacking cards, hence allowing the cards to fall onto the elevator. The arm 964 holds both shutter plates 958 and 959 latched out of the position for stacking cards; the cards continue stacking upon the elevator which is being driven under control of the card counter by the cam 929 through the sprag 936, FIG. 19. However, when the fiftieth card passes between the card sensing finger 913 and card guide 923, the counter 900 advances and the pin 961, set in the hole in the sight wheel 911a' to stack fifty cards, strikes the ear 962 causing the arm 964 to pivot counterclockwise about the pin 965, thereby releasing the flange 971 of the arm 969 from the recessed portion 970 allowing the spring 966 to pivot the arm 969 clockwise to move the shutter plate 958 into position to stack the cards, and as the arm 969 pivots clockwise, the flange 971 strikes the arm 964 at the point 973 to further pivot the arm 964 counterclockwise, thereby releasing the flange 976 from the flange 963 to permit the arm 977 to pivot clockwise about the pin 978 under action of the spring 974 to move the shutter 959 into position to stack the cards. When the arm 969 pivoted clockwise to move the shutter 958 into position to stack the cards, the link 980 was moved downward, thereby pivoting the arm 982 counterclockwise about the pin 983 allowing the arm 986 to pivot clockwise about the pin 987 to clutch the dog 988 into the wheel 989, hence clutching the elevator 926 into the faster driver. The elevator clutched into the faster drive descends to deposit the deck of fifty cards onto the conveyor 990 which moves the deck of cards away from the elevator 926 as the elevator dwells. The elevator 926 then ascends in the manner afore-described to receive the cards stacking on the shutter plates 958 and 959. From the foregoing it is seen that a card is processed through the machine in a little over six card cycles.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A device for receiving record cards successively from an exit station in a card processing machine comprising an elevator for holding stacked record cards that have passed through the exit station, a movable support for said elevator, a cam, a cam follower on said elevator support cooperating with said cam to position said elevator in accordance with the position of said cam, card detecting means for detecting the passage of cards through the exit station, a card counter controlled by said detecting means for counting the number of cards passing through the exit station, first cam actuating means controlled by said counting means for progressively changing the position of said cam thereby to change the position of said elevator progressively in response to the passage of cards to said elevator, and second cam actuating means controlled by said counting means for causing the position of said cam to change at an increased rate when the number of cards delivered to said elevator exceeds a predetermined number.

2. Apparatus for stacking record cards progressively delivered thereto comprising a card elevator movable bidirectionally from and to an initial position, a counter operable to advance one digit position for each record card delivered to said card elevator, a first driving means connected to drive said elevator away from said initial position in synchronism with the advancement of said counter, a second driving means connectable to drive said elevator at a predetermined rate through said first driving means, and connecting means for connecting said second driving means to said first driving means upon said counter reaching a predetermined digit position so that said elevator continues to move away from said initial position for a predetermined period of time and then is driven in an opposite direction to said initial position.

3. Apparatus according to claim 2 wherein said second driving means, upon being connected to said first driving means to drive said elevator, overdrives said first driving means.

4. Apparatus as in claim 3 further comprising means operable by said elevator for actuating said connecting means to disconnect said second driving means from said first driving means upon said elevator returning to said initial position.

5. Apparatus for driving a device for stacking record cards progressively delivered along a predetermined card path comprising a pivotally mounted card sensing lever biased to normally lie in said card path so as to be pivoted by cards traveling along said card path; a deep tooth ratchet counter adapted to be advanced one digit position for each card passing relative to said sensing layer; counter driving means for cyclically driving said counter at a rate so as to advance the counter one digit position for each card cycle; counter latch means connected to said sensing lever to be actuated thereby as the same is pivoted by a record card, said counter latch means being operable to permit said counter to be advanced by said counter driving means if said sensing lever is pivoted by a card and to restrain said counter from being advanced by said counter driving means in the absence of a card pivoting said sensing lever; a cam connected to said counter to be rotated thereby as the counter advances; a cam follower disposed to follow said cam so as to be moved thereby; an elevator drive shaft; an arm pivotally mounted on said elevator drive shaft and rotatably carrying said cam follower; a drive disc fixed to said elevator drive shaft; and a drive sprag pivotally mounted upon said arm and biased to engage said drive disc so that, upon rotation of said cam, said arm is pivoted, whereby said sprag drives said drive disc to drive said elevator shaft.

6. Apparatus as in claim 5 further comprising a cam fixed to be rotated by said elevator drive shaft; an arm pivotally mounted at one end; a cam follower mounted upon said arm to follow said cam; a link mounted to the other end of said arm; a movable rack; an elevator fixed to said movable rack; a stationary rack spaced from said movable rack; and a gear rotatably mounted upon said link so as to engage said stationary and movable racks whereby, upon movement of said link by said arm as the cam is rotated by said elevator drive shaft, the gear is caused to be rotated by said stationary rack and thereby moving said movable rack to carry the elevator along therewith.

7. Apparatus as in claim 6 further comprising a toothed drive wheel journalled upon said elevator drive shaft; an arm pivotally mounted intermediate of its ends to said drive disc, one end of said arm being formed as a dog to engage said toothed drive wheel; a cam follower rotatably mounted on the other end of said arm; a pivotally mounted cam plate having a cam surface movable into and out of the path of said cam follower; a link connected to pivot said cam plate; an actuating arm connected to said link to cause movement thereof; means for urging said actuating arm to move; a latch lever normally cooperating with said actuating arm to hold the same against movement; and means carried by said counter for actuating said latch lever to permit movement of said actuating arm upon said counter reaching a predetermined digit position whereby said link is moved to bring said cam surface into the path of said cam follower causing the arm carrying the cam follower to pivot so that the dog engages the toothed drive wheel.

8. Apparatus as in claim 7 further comprising a gear fixed to said toothed drive wheel, and means for driving said gear at a predetermined rate.

9. Apparatus as in claim 8 further comprising a pivotally mounted first shutter normally urged to move to a position to receive cards, said first shutter having a member cooperating with said latch lever whereby said first shutter is held out of the card receiving position; a second shutter movable to a position to receive record cards; an arm for carrying said second shutter and connected to move with said actuating arm; and means operable upon said elevator reaching a predetermined position for moving said first and second shutters out of the card receiving position, the same having been moved into the card receiving position upon actuation of said latch lever by said means carried by said counter.

References Cited in the file of this patent
UNITED STATES PATENTS

| | | |
|---|---|---|
| 1,673,064 | Dexter | June 12, 1928 |
| 2,228,887 | Peterson | Jan. 14, 1941 |
| 2,277,846 | Couch | Mar. 31, 1942 |
| 2,645,476 | Wood et al. | July 14, 1953 |

UNITED STATES PATENT OFFICE
CERTIFICATE OF CORRECTION

Patent No. 3,033,564              May 8, 1962

Fred M. Carroll et al.

It is hereby certified that error appears in the above numbered patent requiring correction and that the said Letters Patent should read as corrected below.

Column 6, line 66, for "cards" read -- card --; line 74, for "rollers" read -- roller --; column 8, line 46, for "598" read -- 508 --; column 9, line 4, for "press" read -- pressed --; column 11, line 44, for "observe" read -- obverse --; column 21, line 61, for "roller" read -- rollers --; column 22, line 14, for "subsequently" read -- subsequent --; column 24, line 70, after "card", second occurrence, insert a comma; column 26, line 49, for "driver" read -- drive --; column 27, line 42, for "layer" read -- lever --.

Signed and sealed this 27th day of November 1962.

(SEAL)
Attest:
ESTON G. JOHNSON

Attesting Officer

DAVID L. LADD

Commissioner of Patents